US008463130B2

(12) United States Patent
Ma et al.

(10) Patent No.: US 8,463,130 B2
(45) Date of Patent: Jun. 11, 2013

(54) METHOD AND SYSTEM FOR IMPLEMENTING A WIRELESS NETWORK

(75) Inventors: Jianglei Ma, Kanata (CA); Hang Zhang, Nepean (CA); Wen Tong, Ottawa (CA); Ming Jia, Ottawa (CA); Peiying Zhu, Kanata (CA)

(73) Assignee: Apple Inc., Cupertino, CA (US)

( * ) Notice: Subject to any disclaimer, the term of this patent is extended or adjusted under 35 U.S.C. 154(b) by 365 days.

(21) Appl. No.: 12/830,224

(22) Filed: Jul. 2, 2010

(65) Prior Publication Data

US 2011/0164878 A1 Jul. 7, 2011

Related U.S. Application Data

(63) Continuation-in-part of application No. 12/806,186, filed on Jul. 2, 2009, now abandoned.

(60) Provisional application No. 61/078,257, filed on Jul. 3, 2008.

(51) Int. Cl.
*H04B 10/00* (2006.01)

(52) U.S. Cl.
USPC .......................... 398/115; 398/126; 398/172

(58) Field of Classification Search
USPC ............... 398/58, 66–72, 115–117, 126, 128, 398/130, 135, 172
See application file for complete search history.

(56) References Cited

U.S. PATENT DOCUMENTS

| 5,424,859 | A  | * | 6/1995  | Uehara et al. ................. 398/127 |
| 6,128,512 | A  |   | 10/2000 | Trompower et al. |
| 6,310,705 | B1 | * | 10/2001 | Lee et al. ...................... 398/126 |
| 6,363,263 | B1 | * | 3/2002  | Reudink et al. ............ 455/562.1 |
| 7,961,798 | B2 | * | 6/2011  | Jun ................................ 375/260 |
| 7,983,568 | B2 | * | 7/2011  | Won et al. ..................... 398/172 |
| 8,005,366 | B2 | * | 8/2011  | Shin et al. ..................... 398/129 |
| 8,188,878 | B2 | * | 5/2012  | Pederson et al. ......... 340/815.45 |
| 8,264,341 | B2 | * | 9/2012  | Jung et al. ..................... 340/531 |
| 2004/0101312 | A1 | * | 5/2004  | Cabrera ....................... 398/172 |
| 2008/0207170 | A1 |   | 8/2008  | Khetawat et al. |
| 2009/0098871 | A1 |   | 4/2009  | Gogic |
| 2010/0173667 | A1 |   | 7/2010  | Hui et al. |

OTHER PUBLICATIONS

International Search Report and Written Opinion for PCT Patent Application No. PCT/CA2010/000997, date of completion of search: Oct. 1, 2010, 13 pages.
http://www.cellular-news.com/story/32431.php (Cellular-news), Internet Wayback Machine: article captured on Aug. 4, 2008, http://replay.waybackmachine.org/20080804054627//http://www.cellular-news.com/story/32431.php, 3 pages.

* cited by examiner

*Primary Examiner* — Dalzid Singh
(74) *Attorney, Agent, or Firm* — Meyertons, Hood, Kivlin, Kowert & Goetzel, P.C.

(57) ABSTRACT

Aspects of the present invention provide a multi-band hybrid Gigabit wireless communication system which is enabled by a number of different complementary access technologies to realize ubiquitous hyper-connectivity, true broadband, seamless operation and low power consumption. The system is capable of serving fixed, nomadic and mobile scenarios. The multi-band wireless system is a low power wireless system which operates in different frequency bands covering the spectrum from radio wave to optical wave by making use of both regulated bandwidths and unregulated bandwidths. Using low power distributed antenna and low power indoor and outdoor antennas enables the use of unregulated bandwidths as well as regulated bandwidths as the low power nature of the signals reduces the possibility of interference with the regulated use of the signals.

19 Claims, 12 Drawing Sheets

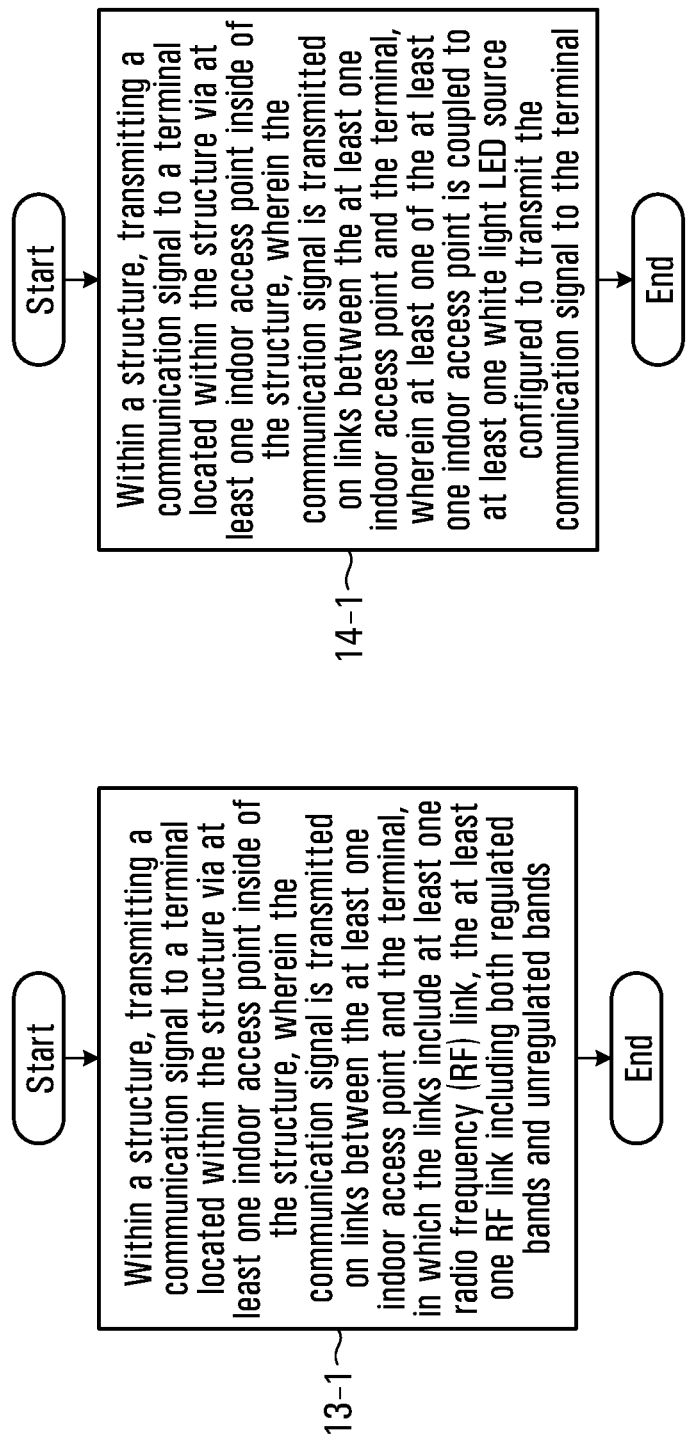

METHOD AND SYSTEM FOR IMPLEMENTING A WIRELESS NETWORK

RELATED APPLICATIONS

This application is a continuation-in-part of the non-provisional application Ser. No. 12/806,186 resulting from conversion under 37 C.F.R. §1.53(c)(3) of U.S. provisional patent application No. 61/222,680 filed on Jul. 2, 2009, now abandoned and which claims the benefit of U.S. provisional patent application No. 61/078,257 filed on Jul. 3, 2008.

FIELD OF THE INVENTION

The invention relates to wireless communication techniques.

BACKGROUND OF THE INVENTION

FIG. 1 shows a base station controller (BSC) 1 which controls wireless communications within multiple cells 2, each cell being served by a corresponding base station (BS) 4. In general, each base station 4 facilitates communications using an air-interface with mobile and/or wireless terminals 6, which are within the cell 2 associated with the corresponding base station 4. Wireless terminals also enter and exit structures within the cells and it is desirable that the wireless terminal maintain connection with the network.

A conventional wireless network can be built based on a single RF frequency band for both indoor and outdoor use. However, with such a wireless network it is difficult to provide Gigabit rate service with low power consumption. Currently there exists spectrum in licensed and unlicensed bands that is generally used for specific purposes, such as PCS for licensed cellular (GSM and CDMA) and 2.4 GHz unlicensed band for WiFI, microwave ovens, cordless phones, etc. There is a huge potential for a system that could exploit all available wireless frequencies, up to and including light.

SUMMARY OF THE INVENTION

According to one aspect of the present invention, there is provided a method comprising: transmitting a communication signal between a base station and a terminal located within a structure via one or more low power distributed antennas, at least one outdoor access point outside of the structure, at least one indoor access point inside of the structure, wherein the communication signal is transmitted on links between the base station and the terminal, in which the links include at least one radio frequency (RF) link, the at least one radio wave link including both regulated bands and unregulated bands.

In some embodiments, the at least one RF link includes a millimeter wave band link or a microwave band link.

In some embodiments, at least one link between the one or more low power distributed antennas is an optical band link.

In some embodiments, a link between a low power distributed antenna and an outdoor access point is an optical band link.

In some embodiments, a link between two indoor access points is an optical band link.

In some embodiments, a link between an indoor access point and the terminal is an optical band link.

In some embodiments, the optical wave link comprises one of: a visual wavelength link; and an infrared wavelength link.

In some embodiments, at least one of the at least one indoor access point is coupled to at least one white light LED source configured to retransmit the communication signal to the terminal, which is configured to receive an optical wave communication signal.

In some embodiments, the at least one white light LED source comprises at least one of: i) a red LED, a green LED and a blue LED that collectively generate white light; and ii) a single LED that is configured to generate white light.

In some embodiments, the at least one white light LED source is configured for use in a frequency division duplex mode of operation or a time division duplex mode of operation.

In some embodiments, the at least one of the at least one indoor access point is coupled to at least one photo detector configured to receive a communication signal from the terminal, which is configured to transmit an optical wave communication signal.

In some embodiments, between at least one of the at least one indoor access point and the terminal there is a relay node configured to receive a communication signal by an RF link and retransmit the communication signal.

In some embodiments, the relay node retransmits the communication signal using one or more white light LED sources.

In some embodiments, the relay node is one of a floor lamp and a desk lamp.

In some embodiments, the communication signal has a universal air-interface when transmitted on different RF frequency links and optical wave band links.

In some embodiments, the universal air-interface is consistent with orthogonal frequency division multiplexing (OFDM) or single carrier frequency division multiplexing (SC-FDM).

In some embodiments, transmitting a communication signal between a base station and a terminal comprises: transmitting the communication signal between a base station and at least one of the one or more low power distributed antennas; transmitting the communication signal between the at least one low power distributed antenna and at least one of the at least one outdoor access point; transmitting the communication signal between the at least one outdoor access point and at least one of the at least one indoor access point; transmitting the communication signal between the at least one indoor access point and the terminal.

In some embodiments, transmitting the communication signal between the base station and the terminal located within the structure comprises one of: i) transmitting the communication signal in a direction from the base station to the terminal; and ii) transmitting the communication signal in a direction from the terminal to the base station.

In some embodiments, the at least one outdoor access point and the at least one indoor access point are low power devices.

According to a second aspect of the present invention, there is provided a method comprising: transmitting a communication signal over a wired connection to a terminal located within a structure via at least one indoor access point inside of the structure, wherein the communication signal is transmitted on links between the at least one indoor access point and the terminal, in which the links include at least one radio frequency (RF) link, the at least one radio wave link including both regulated bands and unregulated bands.

In some embodiments, the at least one RF link includes a millimeter wave band link or a microwave band link.

In some embodiments, a link between two indoor access points is an optical band link.

In some embodiments, a link between an indoor access point and the terminal is an optical band link.

In some embodiments, the optical wave link comprises one of: a visual wavelength link; and an infrared wavelength links.

In some embodiments, at least one of the at least one indoor access point is coupled to at least one white light LED source configured to retransmit the communication signal to the terminal, which is configured to receive an optical wave communication signal.

In some embodiments, the at least one white light LED source comprises at least one of: i) a red LED, a green LED and a blue LED that collectively generate white light; and ii) a single LED that is configured to generate white light.

In some embodiments, the at least one white light LED source is configured for use in a frequency division duplex mode of operation or a time division duplex mode of operation.

In some embodiments, the at least one of the at least one indoor access point is coupled to at least one photo detector configured to receive a communication signal from the terminal, which is configured to transmit an optical wave communication signal.

In some embodiments, between at least one of the at least one indoor access point and the terminal there is a relay node configured to receive a communication signal by RF link and retransmit the communication signal.

In some embodiments, the relay node retransmits the communication signal using one or more white light LED source.

In some embodiments, the relay node is one of a floor lamp and a desk lamp.

In some embodiments, the communications signal has a universal air-interface when transmitted on different RF frequency links and optical wave band links.

In some embodiments, the universal air-interface is consistent with orthogonal frequency division multiplexing (OFDM) or single carrier frequency division multiplexing (SC-FDM).

In some embodiments, transmitting the communication signal between the base station and the terminal located within the structure comprises one of: i) transmitting the communication signal in a direction from the indoor access point to the terminal; and ii) transmitting the communication signal in a direction from the terminal to the indoor access point.

In some embodiments, the at least one indoor access point is a low power devices.

According to a third aspect of the present invention, there is provided a method comprising: within a structure, transmitting a communication signal to a terminal located within the structure via at least one indoor access point inside of the structure, wherein the communication signal is transmitted on links between the at least one indoor access point and the terminal, in which the links include at least one radio frequency (RF) link, the at least one RF link including both regulated bands and unregulated bands.

In some embodiments, the at least one RF link includes a millimeter wave band link or a microwave band link.

In some embodiments, a link between two indoor access points is an optical band link.

In some embodiments, a link between an indoor access point and the terminal is an optical band link.

In some embodiments, the optical wave link comprises one of: a visual wavelength link; and an infrared wavelength link.

In some embodiments, at least one of the at least one indoor access point is coupled to at least one white light LED source configured to retransmit the communication signal to the terminal, which is configured to receive an optical communication wave signal.

In some embodiments, the at least one white light LED source comprises at least one of: i) a red LED, a green LED and a blue LED that collectively generate white light; and ii) a single LED that is configured to generate white light.

In some embodiments, the at least one white light LED source is configured for use in a frequency division duplex mode of operation or a time division duplex mode of operation.

In some embodiments, the at least one of the at least one indoor access point is coupled to at least one photo detector configured to receive a communication signal from the terminal, which is configured to transmit an optical wave communication signal.

In some embodiments, between at least one of the at least one indoor access point and the terminal there is an relay node configured to receive a communication signal by RF link and retransmit the communication signal.

In some embodiments, the relay node retransmits the communication signal using one or more white light LED source.

In some embodiments, the relay node is one of a floor lamp and a desk lamp.

In some embodiments, the communications signal has a universal air-interface when transmitted on different RF frequency links and optical wave band links.

In some embodiments, the universal air-interface is consistent with orthogonal frequency division multiplexing (OFDM) or single carrier frequency division multiplexing (SC-FDM).

In some embodiments, transmitting the communication signal between the indoor access point and the terminal located within the structure comprises one of: i) transmitting the communication signal in a direction from the indoor access point to the terminal; and ii) transmitting the communication signal in a direction from the terminal to the indoor access point.

In some embodiments, the at least one indoor access point is a low power devices.

According to a fourth aspect of the present invention, there is provided a method comprising: within a structure, transmitting a communication signal to a terminal located within the structure via at least one indoor access point inside of the structure, wherein the communication signal is transmitted on links between the at least one indoor access point and the terminal, wherein at least one of the at least one indoor access point is coupled to at least one white light LED source configured to transmit the communication signal to the terminal.

In some embodiments, at least one link between the at least one indoor access point and the terminal is a radio frequency (RF) link, the RF link being at least one of a regulated RF band and an unregulated RF bands In some embodiments, the RF link includes a millimeter wave band link or a microwave band link.

In some embodiments, a link between two indoor access points is one or an RF link or an optical band link.

In some embodiments, the at least one white light LED source comprises at least one of: i) a red LED, a green LED and a blue LED that collectively generate white light; and ii) a single LED that is configured to generate white light.

In some embodiments, the at least one white light LED source is configured for use in a frequency division duplex mode of operation or a time division duplex mode of operation.

In some embodiments, the at least one of the at least one indoor access point is coupled to at least one photo detector configured to receive a communication signal from the terminal, which is configured to transmit an optical wave communication signal.

In some embodiments, between at least one of the at least one indoor access point and the terminal there is a relay node configured to receive a communication signal by RF link and retransmit the communication signal.

In some embodiments, the relay node retransmits the communication signal using one or more white light LED source.

In some embodiments, the relay node is one of a floor lamp and a desk lamp.

In some embodiments, the communications signal has a universal air-interface when transmitted on different band over the various links.

In some embodiments, the universal air-interface is consistent with orthogonal frequency division multiplexing (OFDM) or single carrier frequency division multiplexing (SC-FDM).

In some embodiments, transmitting the communication signal between the indoor access point and the terminal located within the structure comprises one of: i) transmitting the communication signal in a direction from the indoor access point to the terminal; and ii) transmitting the communication signal in a direction from the terminal to the indoor access point.

In some embodiments, the at least one indoor access point is a low power device.

In some embodiments, the structure is one of: a multi-room building, a multi-floor building, a multi-floor multi-room building, a vehicle.

In some embodiments, transmitting a communication signal comprising transmitting a communication signal for unicast, multicast and broadcast scenarios.

According to a fifth aspect of the present invention, there is provided a system comprising: a base station; one or more low power distributed antennas; at least one outdoor access point mounted outside of a structure; at least one indoor access point mounted inside of the structure; wherein the system is configured to transmit a communication signal between the base station and a terminal located within the structure via the one or more low power distributed antennas, the at least one outdoor access point, the at least one indoor access point, wherein the communication signal is transmitted on communication links between the base station and the terminal, in which the links include at least one radio frequency (RF) link, the at least one radio wave link including both regulated bands and unregulated bands.

In some embodiments, at least one link between the one or more low power distributed antennas is an optical band link.

In some embodiments, a link between a low power distributed antenna and an outdoor access point is an optical band link.

In some embodiments, a link between two indoor access points is an optical band link.

In some embodiments, a link between an indoor access point and the terminal is an optical band link.

In some embodiments, the optical wave link comprises one of: a visual wavelength link; and an infrared wavelength link.

In some embodiments, the system further comprises at least one white light LED source configured to retransmit the communication signal to the terminal, which is configured to receive an optical wave communication signal, wherein the at least one white light LED source is couple to an indoor access point.

In some embodiments, the at least one white light LED source comprises at least one of: i) a red LED, a green LED and a blue LED that collectively generate white light; and ii) a single LED that is configured to generate white light.

In some embodiments, the at least one white light LED source is configured for use in a frequency division duplex mode of operation or a time division duplex mode of operation.

In some embodiments, the system further comprises at least one photo detector configured to receive a communication signal from the terminal, which is configured to transmit an optical wave communication signal, wherein the at least one photo detector is couple to an indoor access point.

In some embodiments, the system further comprises a relay node located between an indoor access point and the terminal, the RF node configured to receive a communication signal by an RF link and retransmit the communication signal.

In some embodiments, the relay node retransmits the communication signal using one or more white light LED sources.

In some embodiments, the relay node is one of a floor lamp and a desk lamp.

In some embodiments, the system further comprises a universal air-interface for transmitting the communication signal on different RF frequency links and optical wave band links.

In some embodiments, the universal air-interface is consistent with orthogonal frequency division multiplexing (OFDM) or single carrier frequency division multiplexing (SC-FDM).

In some embodiments, transmitting the communication signal between the base station and the terminal located within the structure comprises one of: i) transmitting the communication signal in a direction from the base station to the terminal; and ii) transmitting the communication signal in a direction from the terminal to the base station.

In some embodiments, the at least one outdoor access point and the at least one indoor access point are low power devices.

According to a sixth aspect of the present invention, there is provided a system comprising: at least one indoor access point mounted inside of a structure; wherein the system is configured to transmit a communication signal between the at least one indoor access point and a terminal located within the structure, wherein the communication signal is transmitted on communication links between the at least one indoor access point and the terminal, in which the links include at least one radio frequency (RF) link, the at least one radio wave link including both regulated bands and unregulated bands.

In some embodiments, the at least one RF link includes a millimeter wave band link or a microwave band link.

In some embodiments, a link between two indoor access points is an optical band link.

In some embodiments, a link between an indoor access point and the terminal is an optical band link.

In some embodiments, the optical wave link comprises one of: a visual wavelength link; and an infrared wavelength links.

In some embodiments, the system further comprises at least one white light LED source configured to retransmit the communication signal to the terminal, which is configured to receive an optical wave communication signal, wherein the at least one white light LED source is couple to an indoor access point.

In some embodiments, the at least one white light LED source comprises at least one of: i) a red LED, a green LED and a blue LED that collectively generate white light; and ii) a single LED that is configured to generate white light.

In some embodiments, the at least one white light LED source is configured for use in a frequency division duplex mode of operation or a time division duplex mode of operation.

In some embodiments, the system further comprises at least one photo detector configured to receive a communication signal from the terminal, which is configured to transmit an optical wave communication signal, wherein the at least one photo detector is couple to an indoor access point.

In some embodiments, the system further comprises a relay node located between an indoor access point and the terminal, the RF node configured to receive a communication signal by an RF link and retransmit the communication signal.

In some embodiments, the relay node retransmits the communication signal using one or more white light LED source.

In some embodiments, the relay node is one of a floor lamp and a desk lamp.

In some embodiments, the system further comprises a universal air-interface for transmitting the communication signal on different RF frequency links and optical wave band links.

In some embodiments, the universal air-interface is consistent with orthogonal frequency division multiplexing (OFDM) or single carrier frequency division multiplexing (SC-FDM).

In some embodiments, transmitting the communication signal between the base station and the terminal located within the structure comprises one of: i) transmitting the communication signal in a direction from the indoor access point to the terminal; and ii) transmitting the communication signal in a direction from the terminal to the indoor access point.

In some embodiments, the at least one indoor access point is a low power device.

According to a seventh aspect of the present invention, there is provided a system comprising: at least one indoor access point mounted inside of a structure; wherein the system is configured to transmit a communication signal to a terminal located within the structure via the at least one indoor access point, wherein the communication signal is transmitted on links between the at least one indoor access point and the terminal, wherein at least one of the at least one indoor access point is coupled to at least one white light LED source configured to transmit the communication signal to the terminal.

In some embodiments, at least one link between the at least one indoor access point and the terminal is a radio frequency (RF) link, the RF link being at least one of a regulated RF band and an unregulated RF bands In some embodiments, the RF link includes a millimeter wave band link or a microwave band link.

In some embodiments, a link between two indoor access points is one or an RF link or an optical band link.

In some embodiments, the at least one white light LED source comprises at least one of: i) a red LED, a green LED and a blue LED that collectively generate white light; and ii) a single LED that is configured to generate white light.

In some embodiments, the at least one white light LED source is configured for use in a frequency division duplex mode of operation or a time division duplex mode of operation.

In some embodiments, the system further comprises at least one photo detector configured to receive a communication signal from the terminal, which is configured to transmit an optical wave communication signal, wherein the at least one photo detector is couple to an indoor access point.

In some embodiments, the system further comprises a relay node located between an indoor access point and the terminal, the RF node configured to receive a communication signal by an RF link and retransmit the communication signal.

In some embodiments, the relay node retransmits the communication signal using one or more white light LED source.

In some embodiments, the relay node is one of a floor lamp and a desk lamp.

In some embodiments, the system further comprises a universal air-interface for transmitting the communication signal on different RF frequency links and optical wave band links.

In some embodiments, the universal air-interface is consistent with orthogonal frequency division multiplexing (OFDM) or single carrier frequency division multiplexing (SC-FDM).

In some embodiments, transmitting the communication signal between the indoor access point and the terminal located within the structure comprises one of: i) transmitting the communication signal in a direction from the indoor access point to the terminal; and ii) transmitting the communication signal in a direction from the terminal to the indoor access point.

In some embodiments, the at least one indoor access point is a low power device.

In some embodiments, the structure is one of: a multi-room building, a multi-floor building, a multi-floor multi-room building, a vehicle.

In some embodiments, transmitting a communication signal comprising transmitting a communication signal for unicast, multicast and broadcast scenarios.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the attached drawings in which:

FIG. 13 is a flow chart of yet another example method of transmitting a communication signal over a network according to some embodiments of the invention; and FIG. 14 is a flow chart of still a further example method of transmitting a communication signal over a network according to some embodiments of the invention.

DETAILED DESCRIPTION OF THE EMBODIMENTS OF THE INVENTION

Aspects of the present invention provide a multi-band hybrid Gigabit wireless communication system which is enabled by a number of different complementary access technologies to realize ubiquitous hyper-connectivity, true broadband, seamless operation and low power consumption. The system is capable of serving fixed, nomadic and mobile scenarios.

In some embodiments the multi-band wireless system is a low power wireless system which operates in different frequency bands covering the spectrum from radio wave to optical wave by making use of both regulated bandwidths and unregulated bandwidths. Using low power distributed antenna and low power indoor and outdoor antennas enables the use of unregulated bandwidths as well as regulated bandwidths as the low power nature of the signals reduces the possibility of interference with the regulated use of the signals, for example the white space between digital television channel frequencies.

Frequencies in the radio frequency (RF) band may include microwave and millimeter wave bands and frequencies in the optical wave band may include the infra-red and visible bands.

The different frequency bands, either RF or optical, are suitable for different deployment environments, for example, indoor or outdoor; long distance or short distance; line of sight (LOS) or non-LOS; and mobility or fixed/nomadic.

In some embodiments, the wireless network operates in multiple frequency bands ranging from microwave to optical wave. Each link in the network, for example, indoor/outdoor backhaul or indoor/outdoor link, can be optimized individually in different frequency bands.

In some embodiments, a same air-interface, for example, orthogonal frequency division multiplexing access (OFDMA) or single carrier frequency division multiplexing access (SC-FDMA), can be utilized for different frequency bands to allow a terminal device to operate in multiple frequency bands with the same frame structure, same modulation method and same base-band processing functions.

In some embodiments, an indoor wireless link can be generated by white light emitting diodes (LEDs), which can also be used for lighting.

In some embodiments the above concepts can be applied to different types of wireless networks. In some embodiments the wireless network may include cellular networks and enterprise networks.

White Wireless Network Solution

The white wireless network may operate in multiple frequency bands covering the RF and optical bands, that is ranging from below microwave to optical wave. In some embodiments the term white wireless network is used to describe the network due to wide bandwidth associated with the network, somewhat along the lines of white noise being termed so because it includes an infinite bandwidth.

Figure 1:
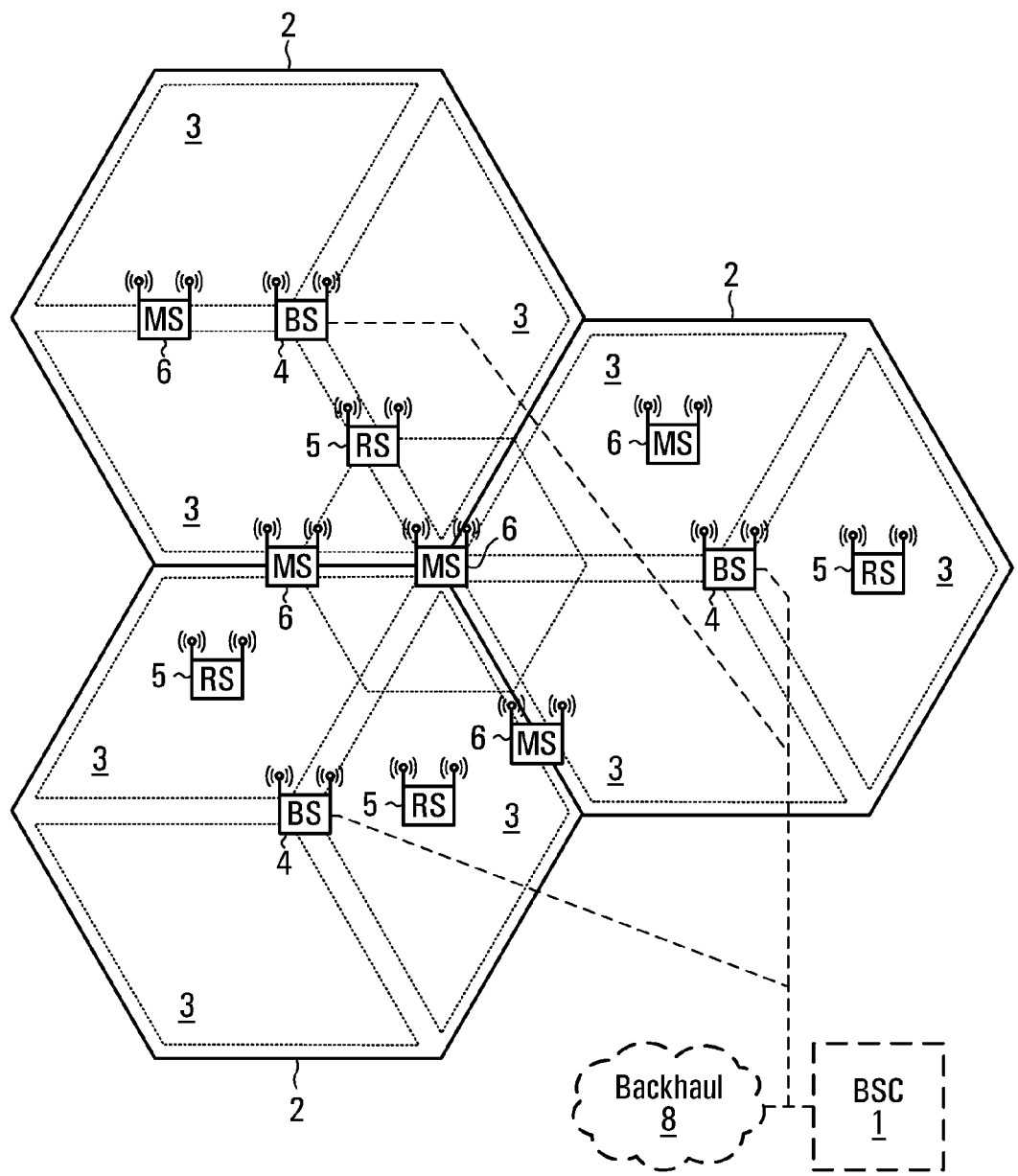
FIG. 1 is a schematic drawing of a wireless network.
Figure 2:
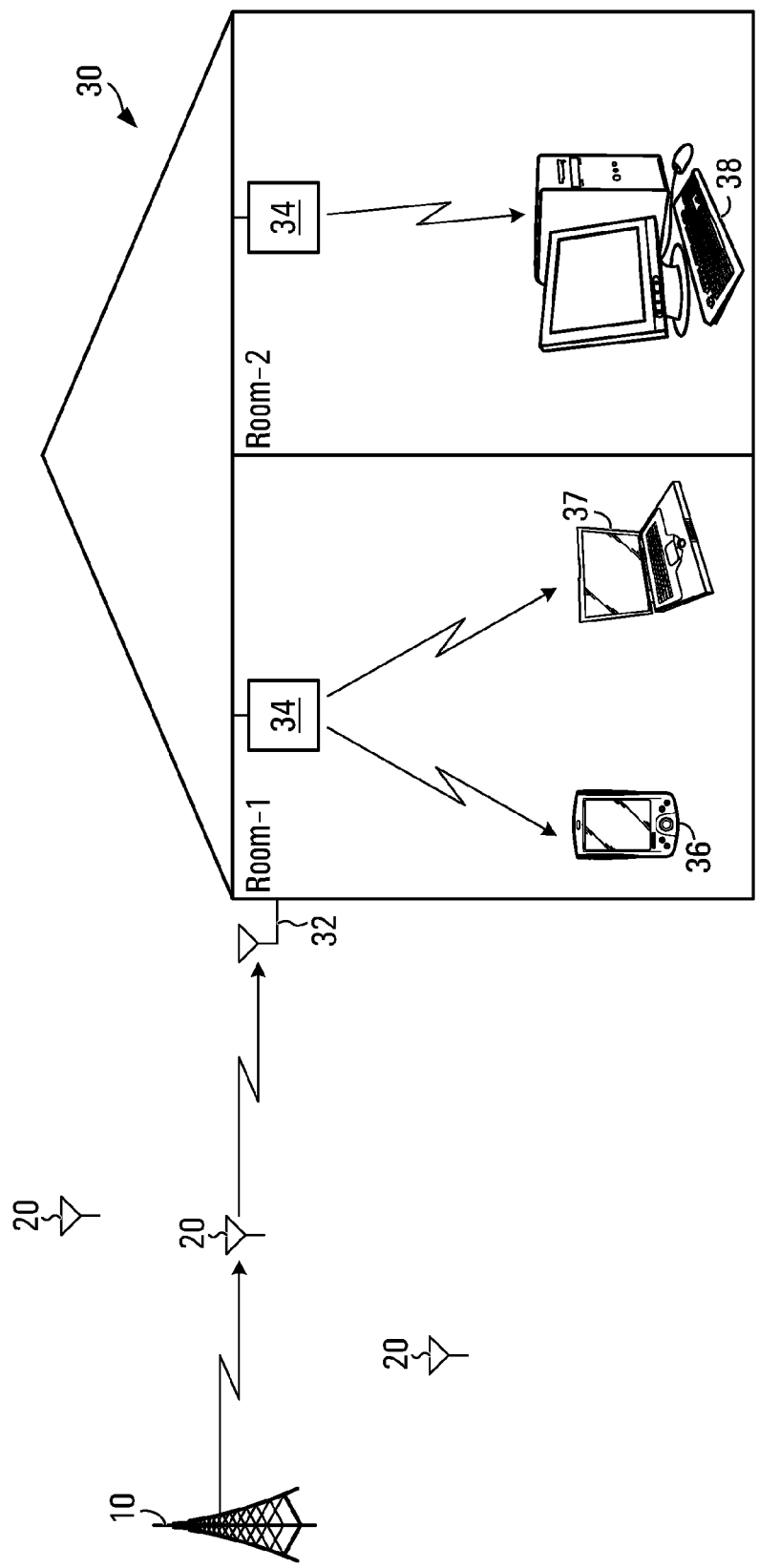
FIG. 2 is a schematic diagram of an example network according to an embodiment of the invention.

Referring to FIG. 2, an example of a network configured to implement aspects of the invention will now be described. FIG. 2 includes a base station 10, three low power distributed antennas 20 and a structure 30 in which multiple terminals are located. Particular terminals indicated in FIG. 2 include a cellphone 36, a laptop computer 37 and a desktop computer 38. Further examples of terminals may include, but are not limited to, PDAs, tablets, and video game machines. The structure 30 has an outdoor access point 32 and two indoor access points 34.

In operation, the base station 10 receives communication from a source in the network to be passed on to a terminal in the structure 30. The base station 10 sends a communication to the low power distributed antennas 20. The low power distributed antennas 20 then forward the communication to the outdoor access point 32 of the structure 30. The outdoor access point 32 then forwards the communication to the indoor access point 34. The indoor access point 34 forwards the communication on to the terminals. This direction of transmission is known as down link (DL). Communication going the other direction from the terminal back to the base station 10 follow substantially the same route in the reverse order and is known as uplink (UL).

In some embodiments a communication sent by a base station 10 may be received by multiple low power distributed antennas 20 and each of the low power distributed antennas 20 then forwards the communication signal on to one or more outdoor access points 32 of the structure 30 in which the terminal or terminals that are the end destination for the communication are located. In some embodiments, two or more outdoor access points 32 may then combine the communications from the low power distributed antennas 20. Each of multiple outdoor access points 32 could perform the same combining process. In some embodiments the communication may be combined, for example, using diversity combining. In a similar manner, multiple outdoor access points 32 could retransmit the communication and each of one or more indoor access points 34 could receive the communication from the multiple outdoor access points 32. Each of multiple indoor access points 34 could perform a similar combining process described above. In a similar manner, relay nodes between the indoor access points 34 and the terminal could retransmit the communication and each of one or more terminals could receive the communication from multiple relay nodes. A terminal could also receive the communication from each of one or more indoor access points 34 or one or more relay nodes and combine the communication before decoding.

In some embodiments, based on the air interface used to send the communication, the base station 10 is capable of unicast (communication directed to a single terminal in the network), multicast (communication directed to a multiple terminals in the network) and broadcast (communication directed to all terminals in the network).

In some embodiments, the network is able to dynamically reroute a communication signal. As a particular example, when one link of a collective group of links that form an overall link between two points is determined not to be provided a suitable connection, the network can change to a different band to compensate, i.e if an optical link using a white LED source for some reason stop working effectively between an indoor access point and a terminal, that link may be converted to an RF link between the indoor access point and terminal.

FIG. 2 is illustrating a specific example of a select portion of a network. It is to be understood that, more generally, the network is not to be limited to the particular embodiment described. In particular, there are likely more than a single base station, there may be more or less than three low power distributed antennas, and there are likely multiple structures within range of a base station each having one or more outdoor access points and multiple indoor access point. In some embodiments, the structure may have multiple floors, such as, but not limited to, an apartment building, office building or a hospital. In some embodiments, the "structure" may not even be a building, but may be a vehicle such as, but not limited to, an airplane, train or bus. In such embodiments, the vehicle may be mobile and roam in a manner that a terminal in such a vehicle may be handed off between low power distributed antennas or handed off between base stations in different cells being served by different base stations.

While FIG. 2 illustrates two terminals in communication with a first indoor access point and a single terminal in communication with a second indoor access point, it is to be understood that these are merely examples of numbers of terminals connected to the network and more generally any number of terminals, up to a number of terminals capable of being supported by a respective indoor access point, can be in communication with the indoor access points.

The low power distributed antennas 20 may also be known as relays. There may be more than a single low power distributed antenna between a base station and the outdoor access point.

In some embodiments, the wireless backhaul link between base stations or between a base station and a node that provides communication with the remainder of the network is a microwave link or point-to-point ultra short pulsed optical wave link.

In some embodiments, the wireless connection between the base station and the low power distributed antennas is a microwave link.

In some embodiments, the wireless connection between low power distributed antennas is a microwave link, a millimeter wave link or free space optical wave link. In some embodiments, the low power distributed antennas are directive antennas that utilize beam forming to reduce or focus the transmit power.

In some embodiments, the wireless connection between a low power distributed antenna and an outdoor wireless access point may include a microwave link, a millimeter wave link or a free space optical wave link. In some implementations, the outdoor wireless access point may act as a low power distributed antenna. In some embodiments, the low power distributed antennas are directive antennas that utilize beam forming to reduce the transmit power.

In some embodiments the distance between a base station and a structure in which a terminal is located may be large enough that the communication is received and retransmitted by multiple low power distributed antennas between the base station and the structure.

In some embodiments, the wireless connection between an outdoor access point and an indoor access point is a low power microwave link. In some embodiments, the low power distributed antennas are directive antennas that utilize beam forming to reduce the transmit power.

In some embodiments, the wireless connection between an outdoor access point and an indoor access point may use unused digital TV channel whitespace bands.

In some embodiments, the wireless connection between indoor access points are microwave links, millimeter wave links or optical wave links. Such types of links may provide a wireless network with better security and significantly reduced electromagnetic interference. In some embodiments, non-line of sight (LOS) links can utilize point-to-point millimeter wave links. In some embodiments, line of sight (LOS) links can utilize point-to-point light wave links.

In some embodiments, the wireless connection between indoor access points and a terminal may be provided by millimeter wave links or wireless optical links.

It is to be understood that not all of the terminals within a proximity of coverage of an indoor access point are necessarily communicating with the indoor access point simultaneously.

There is currently an enormous amount of unregulated bandwidth available for low power communications applications. Using low power links between indoor access points reduces interference between links operating in adjacent areas served by respective indoor access points, such as rooms in a home or building or even cars in a train. Low power links reduce inter-area interference and enables frequency reuse.

In some embodiments, wireless optical links can be used in implementations where electromagnetic interference is prohibited, such as, but not limited to, hospitals and airplanes.

In some embodiments, the wireless indoor network comprising the indoor access points and terminal can be implemented together with a wireline access technology that is used in providing communication to a structure. For example, instead of having a wireless link between a base station and an outdoor access point, a wired link, such as, but not limited to, fiber-to-home, coax cable or copper line may provide communication to the structure, and there is an interface between the wired link and the indoor access links. In some embodiments, the wired links may be used in conjunction with wireless links.

Universal Air-Interface

A common, or universal, air-interface, for example OFDMA or SC-FDMA, can be implemented across different frequency bands to allow communication between the base station and the terminal device over multiple links using different frequency bands. Therefore, in some embodiments using the same common air-interface ensures the communications use the same or substantially similar frame structure, the same or substantially similar modulation method and the same or substantially similar base-band processing functions.

For microwave and millimeter wave links, OFDMA can tolerate multipath fading. For optical wave links, OFDMA can support multi-source reception. In a particular example, an indoor portion of a wireless link system utilizes white light emitting diode (LED) lights. The LEDs can be used for communications within a structure as well as lighting within the structure.

The air-interface may use different front-end receivers. In the example of microwave and millimeter wave bands the receiver is a radio frequency (RF) receiver. In the example of optical wave bands the receiver is a photo detector receiver, such as but not limited to, a photodiode receiver.

In various embodiments the air-interface may use different antenna technology appropriate to the respective links of the network.

Depending on the format of the air-interface, for example an air interface in which a Fourier transform may be utilized, different FFT size and sampling frequency values may be utilized. In some embodiments, the FFT size and sampling frequency values are scalable as appropriate between different frequency bands.

White LED for Lighting and Communications

In some embodiments white LEDs can be used for both lighting purposes and an optical wireless communication link. There are multiple ways to generate "white light" using LEDs. A first way involves combining "rainbow" groups of three LEDs, such as red, green, and blue LEDs, that when combined generate white light. A second way involves creating a frequency shift in a single LED such that the LED emits white light.

The light emitted by LEDs is considered to be more directional than incandescent or fluorescent bulbs. Therefore, using LEDs provides lighting having a defined directionality. In some embodiments it is possible to provide wide area room lighting by concentrated arrays of LEDs, using either of the first or second ways of generating white light described above.

In some embodiments optical wireless communications can be provided using the white light LEDs for either frequency division duplexing (FDD) or time division duplexing (TDD).

In some implementations FDD can be implemented for rainbow groups of three LEDs in which the three colors can be used as three independent carriers. The carriers can be assigned to down link (DL) and uplink (UL).

For FDD there are multiple ways to assign the carriers between DL and UL. In some embodiments the ratio of DL to UL carriers is fixed, for example, two carriers for DL to one carrier for UL. In some embodiments, the ratio of DL to UL carriers is changeable by dynamically changing the number of the carriers assigned for DL and UL transmissions.

In a particular example, red and green wavelengths are used for DL and the blue wavelength is used for UL. In some embodiments, in addition to having the LEDs as part of the communication system in a given room, one or more photo detectors would also be coupled to an indoor access point to receive UL information from a terminal or relay node that receives a communication from a terminal and forwards the communication on to the photo detector. In some embodiments, the photo detector is optimized for a particular wavelength, such that it is used for a fixed, lone wavelength for UL. In some embodiments, the photo detector is receptive to a broad range of wavelengths such that the UL carrier wavelength could be dynamically changed.

In some embodiments, the terminal is configured for transmitting one or both of optical and RF communications. The terminal may have an infrared or colour based LED to communicate with the UL photo detector. In some implementations, the terminal is configured to have a photo detector to enable receiving DL communication in either infrared or visible optical wavelength ranges.

In some embodiments single wavelength optical filters can be used to reduce natural light interference.

In some implementations TDD can be implemented for frequency shift LEDs, such that the LEDs are used for a portion of time for uplink and for a portion of time for downlink.

In some embodiments, the directivity of the LEDs can be used to reduce interference between different links.

In some embodiments, directional transmission for a link between the indoor access points is usually positioned physically higher in a room than an LED array utilized for room lighting and communication.

In a case where there is only directional, small range lighting (a desk lamp or floor lamp for example), the interference between different links can be minimized.

The spectrum efficiency can be further improved by exploiting the orthogonality of two linearly polarized radiations.

In some embodiments, to enable roaming within a room and between rooms, a low rate RF link can be offered simultaneously. For example, using the whitespace between active digital television channels. In some embodiments, whitespace can also be used for the indoor backhaul.

In some embodiments, the white light LEDs are used in overhead lights used for illuminating a room. In some embodiments, the white light LEDs are included in desk lamps or floor lamps, or both, that are used for localized lighting in a room. In some embodiments desk lamps and floor lamps that are equipped with white light LEDs also include photo detectors that enable DL communications to be received from overhead lights and/or UL communications to be received from terminals in close enough proximity to the desk and floor lamps to be in communication with the desk and floor lamps.

In some embodiments desk lamps and floor lamps are equipped with RF receivers or transmitters, or both, that enable DL communications to be received from indoor access points and/or UL communications to be received from terminals in close enough proximity to the desk and floor lamps to be in communication with the desk and floor lamps via RF band communications. In some implementations, the desk or floor lamps may receive an RF communication from the indoor access point and retransmit the communication to a terminal using the white light LEDs in the lamp. In some implementations, the desk or floor lamps may receive an RF communication from a terminal and retransmit the communication to an indoor access point using the white light LEDs in the lamp.

In some embodiments beamforming is applied to reduce interference with, for example, a TV broadcast service.

Detailed examples of wireless link deployment in a home environment for use with wireless and wired communications to the home environment, wireless link deployment in an office building environment for use with wireless communications to the office building environment and wireless link deployment in a hospital environment for use with wireless communications to the hospital environment will now be described with reference to FIGS. 3 to 10.

Figure 3:
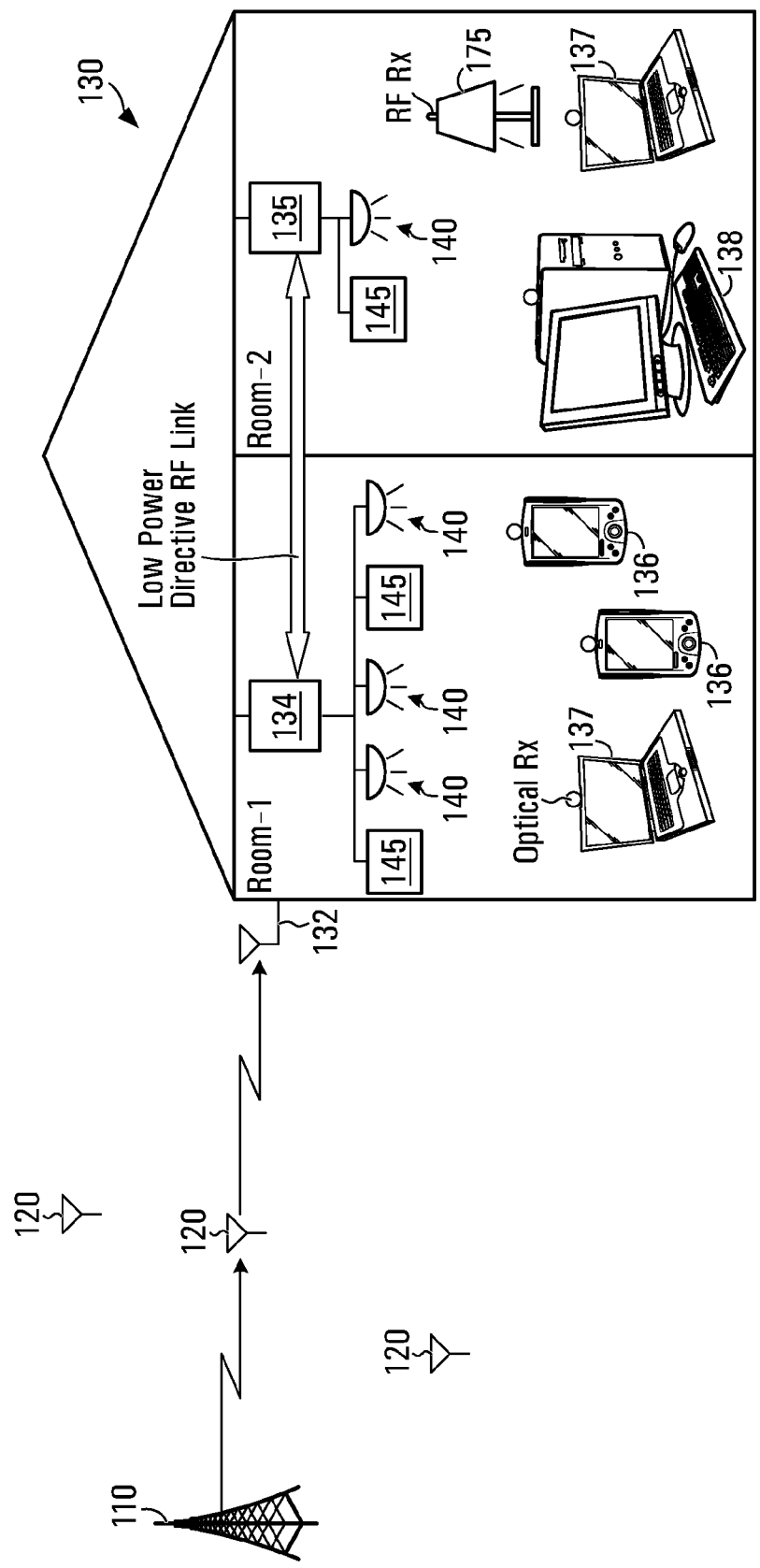
FIG. 3 is a schematic diagram of an example network according to an embodiment of the invention for which optical wave and radio frequency (RF) wave links are utilized with an endpoint of the network being a structure having a wireless connection to a network.

FIG. 3 illustrates a portion of a network substantially the same as FIG. 2, but in-structure communication elements are illustrated for a particular example of a combination of RF and optical wave links.

FIG. 3 includes a base station 110, three low power distributed antennas 120 and a structure 130 in which multiple terminals are located. Particular terminals indicated in FIG. 3 include a cellphone 136, a laptop computer 137 and a desktop computer 138. Further examples of terminals may include, but are not limited to, PDAs, tablets, and video game machines. The structure 130 has an outdoor access point 132, a first indoor access point 134 and a second indoor access point 135. There is a directive link between the indoor access points for communications between the indoor access points 134,135. The directive link may be configured to allow communications over an RF link, an optical wave link, or both. In FIG. 3 the first indoor access point 134 is illustrated to be coupled to an array of three distinct LED white light sources 140. Each of the LED white light sources 140 may include one or more white light LEDs or groupings of coloured LEDs that result in white light. The first indoor access point 134 is illustrated to be coupled to two photo detector arrays 145 for detecting optical signals transmitted by terminal devices in the room, or from optical relay nodes, such as desk or floor lamps that are transmitting signals from terminal devices, or both.

In FIG. 3 the second indoor access point 135 is illustrated to be coupled to a single distinct LED white light source 140. The LED white light source 140 may include one or more white light LEDs or groupings of coloured LEDs that result in white light. The second indoor access point 135 is illustrated to be coupled to one photo detector array 145 for detecting optical signals transmitted by terminal devices in the room or optical relay nodes, such as desk or floor lamps that are transmitting signals from terminal devices, or both.

While FIG. 3 illustrates two rooms in the structure 130 having three white light LED sources 135 and two photo detectors 145 in one room and one white light LED source 140 and one photo detector 145 in another room and a number of terminals, it is to be understood that the number of rooms in the structure, the number of white light LED sources, the number of photo detectors and the number of terminals are implementation specific.

In operation, for DL operation, the base station 110 receives communication from a source in the network to be passed on to a terminal in the structure 130. The base station 110 sends a communication to one or more of the low power distributed antennas 120. The low power distributed antennas 120 then forward the communication to the outdoor access point 132 attached to the structure 130. The outdoor access point 132 then forwards the communication to the indoor access points 134,135. The indoor access points 134,135 forward the communication on to the terminals via an optical wave link using the white light LEDs or via the RF link via RF transmitters, or to RF relay nodes 175 and from there on to terminals via an optical wave link using the white light LEDs or via the RF link via RF transmitters.

For UL operation, the terminal communicates with the indoor access point 134,135 either directly via an RF link or via the white light LEDs to the indoor access point 134,135 or to an RF relay node 175 and onto the indoor access point 135. In some implementations, the terminal device has an RF antenna to communicate with an RF receiver in the indoor access point. In some embodiments there may be an RF receiver external to the indoor access point that the terminal communicates with and which communicates with the indoor access point. The indoor access point 134,135 then communicates with the outdoor access point 132, the outdoor access point 132 with one or more of the low power distributed antennas 120 and the low power distributed antennas 120 with the base station 110 in the reverse order to that described above in operation of DL communications.

Figure 4:
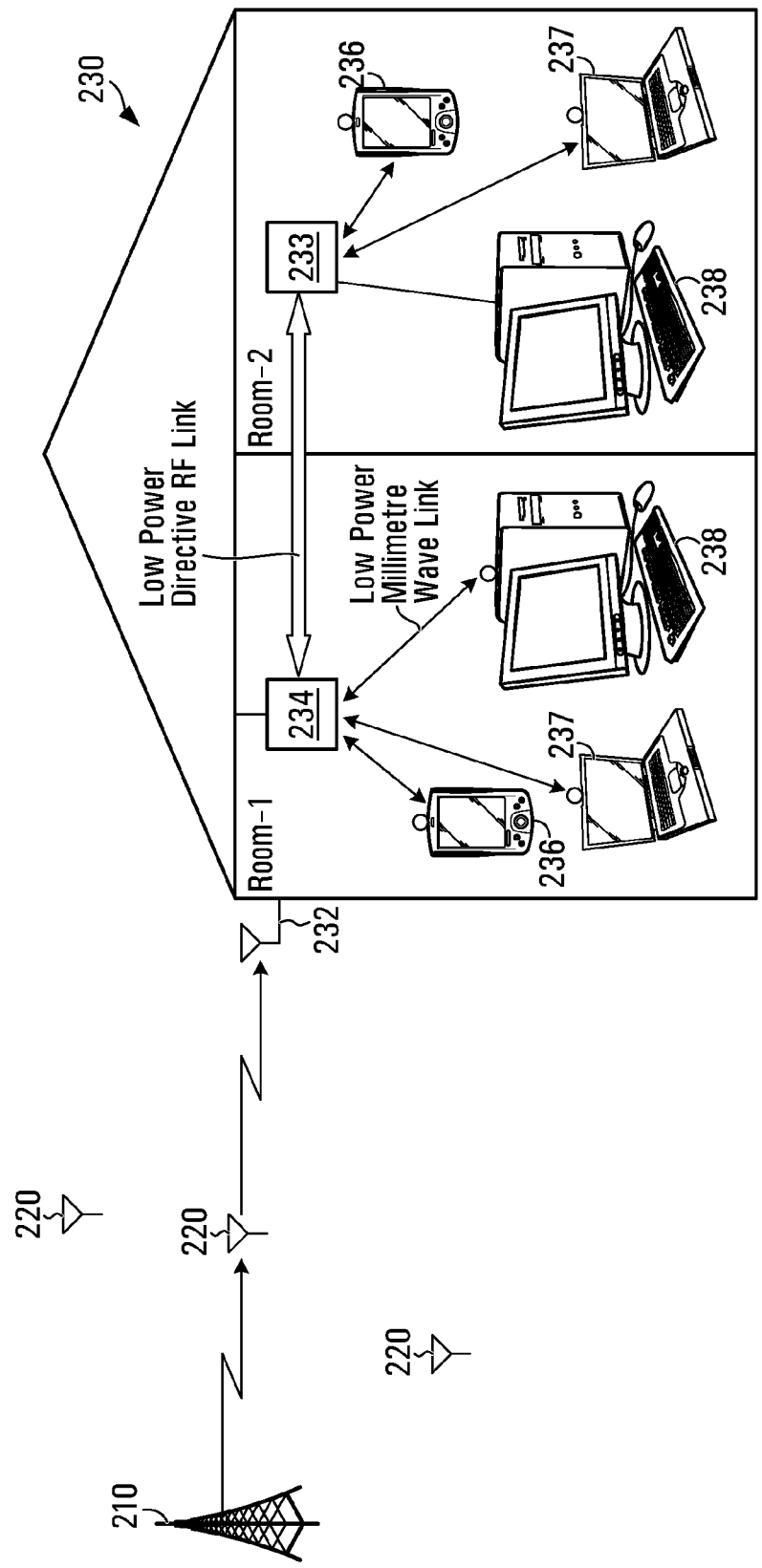
FIG. 4 is schematic diagram of an example network according to an embodiment of the invention for which RF wave links are utilized with an endpoint of the network being a structure having a wireless connection to a network.

FIG. 4 illustrates a portion of a network substantially the same as FIG. 2, but the in-structure communication elements are illustrated for a particular example of RF links.

FIG. 4 includes a base station 210, three low power distributed antennas 220 and a structure 230 in which multiple terminals are located. Particular terminals indicated in FIG. 4 include a cellphone 236, a laptop computer 237 and a desktop computer 238. Further examples of terminals may include, but are not limited to, PDAs, tablets, and video game machines. The structure 230 has an outdoor access point 232, an indoor access point 234 and an RF relay node 233. There is a directive link between the indoor access point 234 and the RF relay node 233. The directive link is configured to allow communications over an RF link. In FIG. 4 the indoor access point 234 is illustrated to provide direct communication with terminals in the room in which the indoor access point 234 is located.

In FIG. 4 the RF relay node 233 is illustrated to provide a direct wireline communication link with a desktop computer 238 and wireless communication with terminals 236,237 that are also in the room in which the RF relay node 233 is located.

While FIG. 4 illustrates two rooms in the structure 230 having a single indoor access point and a number of terminals, it is to be understood that the number of rooms in the structure, the number of indoor access points and the number of terminals are implementation specific.

In operation, for DL operation, the base station 210 receives communication from a source in the network to be passed on to a terminal in the structure 230. The base station 210 sends a communication to one or more of the low power distributed antennas 220. The low power distributed antennas 220 then forward the communication to the outdoor access point 232 of the structure 230. The outdoor access point 232 then forwards the communication to the indoor access point 234. The indoor access point forwards the communication on to the terminals or the RF relay node to forward on to the terminals.

For UL communications, the terminal device communicates with the indoor access point 234 directly via an RF link or to the RF relay 233 and on to the indoor access point 234. In some implementations, the terminal device has an RF antenna to communicate with an RF receiver in the indoor access point. In some embodiments there may be an RF receiver external to the indoor access point that the terminal communicates with and which communicates with the indoor access point. The indoor access point 234 then communicates with the outdoor access point 232, the outdoor access point 232 with one or more of the low power distributed antennas 220 and the low power distributed antennas 220 with the base station 210 in the reverse order to that described above in operation of DL communications.

Figure 5:
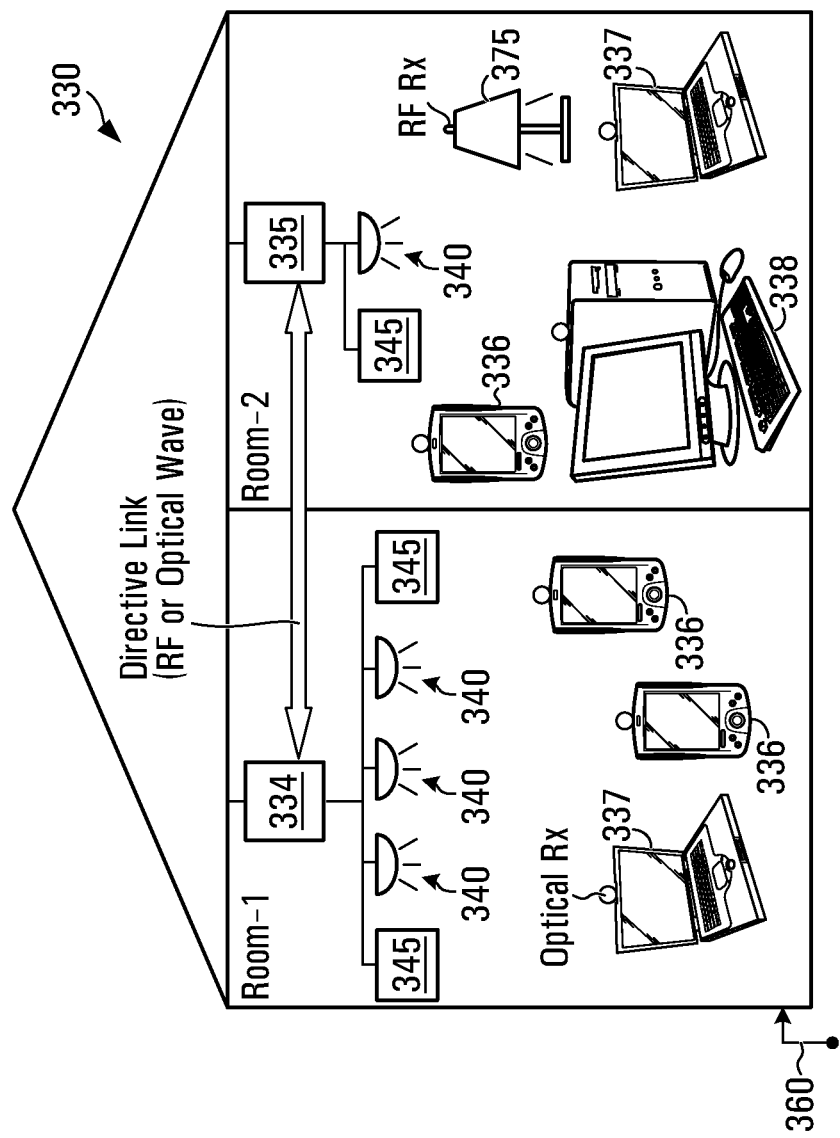
FIG. 5 is schematic diagram of an example network according to an embodiment of the invention for which optical wave and radio frequency (RF) wave links are utilized with an endpoint of the network being a structure having a wireline connection to a network.

FIG. 5 illustrates a portion of a network in which the in-structure communication elements are substantially the same as FIG. 3, but instead of a wireless communication network between a base station and the structure, there is a wired connection providing communication with the structure.

FIG. 5 includes a structure 330 in which multiple terminals are located. Particular terminals indicated in FIG. 5 include a cellphone 336, a laptop computer 337 and a desktop computer 338. Further examples of terminals may include, but are not limited to, PDAs, tablets, and video game machines. The structure 330 has a wired connection 360, a first indoor access point 334 and a second indoor access point 335. There is a directive link between the indoor access points 334,335 for communications between the indoor access points 334,335. The directive link may be configured to allow communications over an RF link, an optical wave link, or both. In FIG. 5 the first indoor access point 334 is illustrated to be coupled to an array of three distinct LED white light sources 340. Each of the LED white light sources 340 may include one or more white light LEDs or groupings of coloured LEDs that result in white light. The first indoor access point 334 is illustrated to be coupled to two photo detector arrays 345 for detecting optical signals transmitted by terminal devices in the room, or relay nodes 375, such as desk or floor lamps, which are transmitting signals from terminal devices, or both.

In FIG. 5 the second indoor access point 335 is illustrated to be coupled to a single distinct LED white light source 340. The LED white light source 340 may include one or more white light LEDs or groupings of coloured LEDs that result in white light. The second indoor access point 335 is illustrated to be coupled to one photo detector array 345 for detecting optical signals transmitted by terminal devices in the room, or relay nodes 375, such as desk or floor lamps, which are transmitting signals from terminal devices, or both.

While FIG. 5 illustrates two rooms in the structure 330 having three white light LED sources 340 and two photo detectors 345 in one room and one white light LED source 340 and one photo detector 345 in another room and a number of terminal, it is to be understood that the number of rooms in the structure, the number of white light LED sources, the number of photo detectors and the number of terminals are implementations specific.

In operation, for DL operation, the wired connection 360 delivers communication from a source in the network to be passed on to a terminal in the structure 330. The indoor access points 334,335 receive communications from the wired connection 360 and forward the communications on to the terminals via an optical wave link using the white light LEDs or via the RF link via RF transmitters, or to relay nodes 375 and from there on to terminals via an optical wave link using the white light LEDs, or via the RF link via RF transmitters.

For UL communications, the terminal device communicates with the indoor access point 334,335 either directly via an RF link or via the white light LEDs to the indoor access point 334,335, or to a relay node 375 and onto the indoor access points 335. In some implementations the terminal device has an RF antenna to communicate with an RF receiver in the indoor access point. In some embodiments there may be an RF receiver external to the indoor access point that the terminal communicates with and which communicates with the indoor access point. The indoor access points 334,335 then communicate with the wired connection 360 to send the UL communication back to the network on the wired connection.

Figure 6:
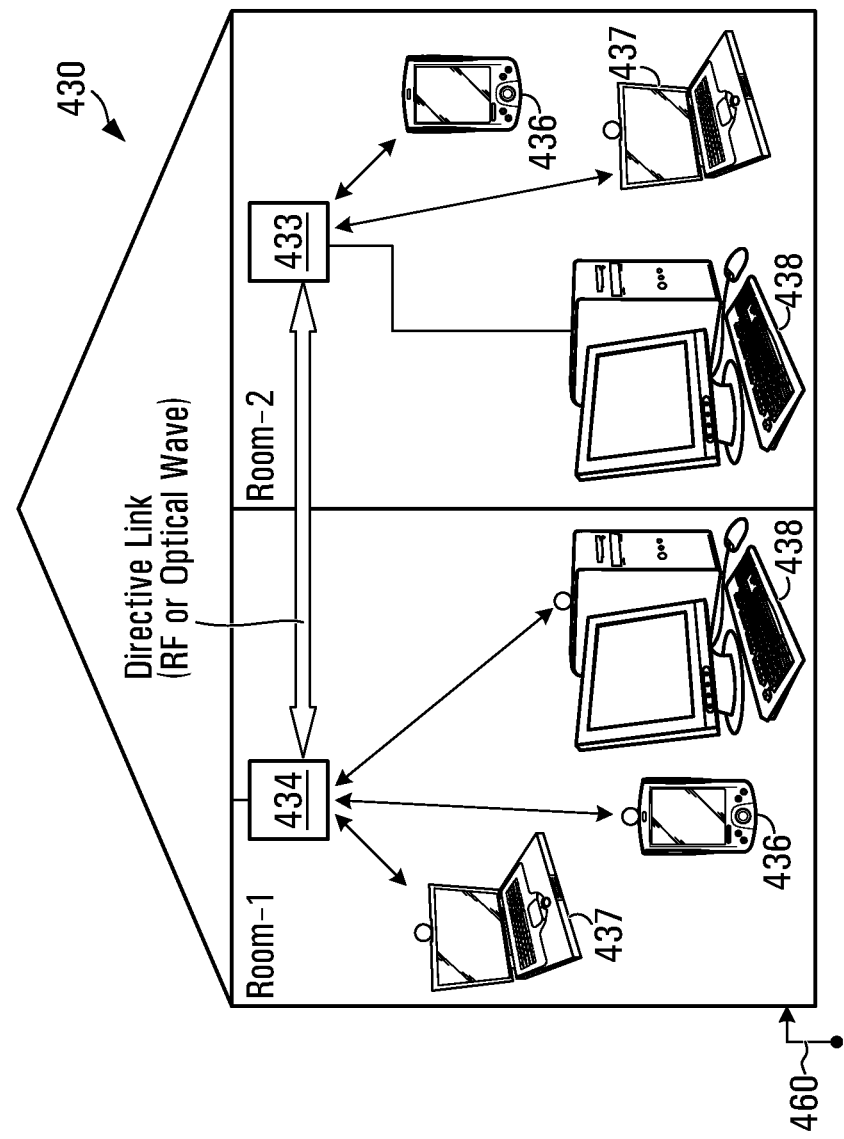
FIG. 6 is schematic diagram of an example network according to an embodiment of the invention for which RF wave links are utilized with an endpoint of the network being a structure having a wireless connection to a network.

FIG. 6 illustrates a portion of a network in which the in-structure communication elements are substantially the same as FIG. 4, but instead of a wireless communication network between a base station and the structure, there is a wired connection providing communication with the structure.

FIG. 6 includes a structure 430 in which multiple terminals are located. Particular terminals indicated in FIG. 6 include a cellphone 436, a laptop computer 437 and a desktop computer 438. Further examples of terminals may include, but are not limited to, PDAs, tablets, and video game machines. The structure 430 has wired connection 460 to the structure 430, an indoor access point 434 and a relay node 433. There is a directive link between the indoor access point 434 and the relay node 433. The directive link is configured to allow communications over an RF link. In FIG. 6 the indoor access point 434 is illustrated to provide direct communication with terminals in the room in which the indoor access point 433 is located.

In FIG. 6 the relay node 433 is illustrated to provide direct wireline communication with a desktop computer 438 and wireless communication with terminals that are also in the room in which the relay node 433 is located.

While FIG. 6 illustrates two rooms in the structure 430 having a single indoor access point and a number of terminals, it is to be understood that the number of rooms in the structure, the number of indoor access points and the number of terminal are implementation specific.

In operation, for DL operation, the wired connection 460 delivers communication from a source in the network to be passed on to a terminal in the structure 430. The indoor access point 434 receives communications from the wired connection 460 and forwards the communications on to the terminals via the RF link via RF transmitters or forwards the communications on to the relay node 433 and the relay node forwards the communication on to terminals via the RF link via RF transmitters.

For UL communications, the terminal device communicates with the indoor access point 434 directly via an RF link or via the relay node 433 on to the indoor access point 433 via an RF link. In some implementations the terminal device has an RF antenna to communicate with an RF receiver in the indoor access point. In some embodiments there may be an RF receiver external to the indoor access point that the terminal communicates with and which communicates with the indoor access point. The indoor access point 433 then communicates with the wired connection 460 to send the UL communication back to the network on the wired connection.

Figure 7:
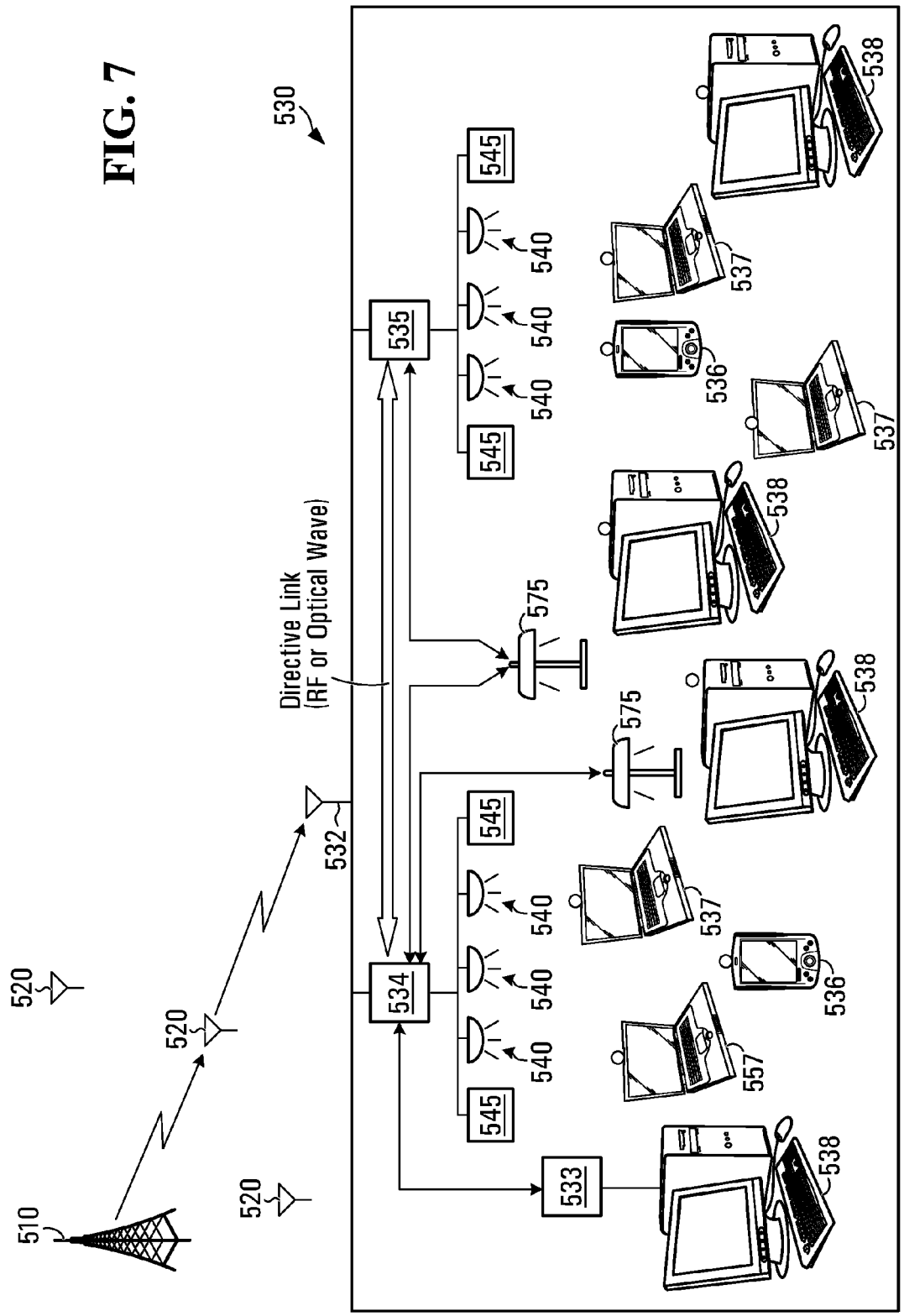
FIG. 7 is schematic diagram of another example network according to an embodiment of the invention for which optical wave and RF wave links are utilized with an endpoint of the network being a structure having a wireless connection to a network.

FIG. 7 illustrates a portion of a network substantially the same as FIG. 2, but in-structure communication elements are illustrated for a particular example of a combination of RF and optical wave links for a wireless office building deployment.

FIG. 7 includes a base station 510, three low power distributed antennas 520 and a structure 530 in which multiple terminals are located. Particular terminals indicated in FIG. 7 include a cellphone 536, a laptop computer 537 and a desktop computer 538. Further examples of terminals may include, but are not limited to, PDAs, tablets, and video game machines. The structure 530 has an outdoor access point 532, a first indoor access point 534 and a second indoor access point 535. There is a directive link between the indoor access points 534,535 for communications between the indoor access points 534,535. The directive link may be configured to allow communications over an RF link, an optical wave link, or both. There are also several lamps 575 in the room that are enabled to receive RF communications from one or more of the first and second indoor access points 534,535, retransmit the communications via RF links or white light LEDs to the terminals (DL direction), and receive communications via an optical link or an RF link from terminals and retransmit the communications to the indoor access points 534,535 (UL direction).

In FIG. 7 the first indoor access point 534 is illustrated to be coupled to an array of three distinct LED white light sources 540. Each of the LED white light sources 540 may include one or more white light LEDs or groupings of coloured LEDs that result in white light. The first indoor access point 534 is illustrated to be coupled to two photo detector arrays 545 for detecting optical signals transmitted by terminal devices in the room or relay nodes, such as desk or floor lamps that are transmitting signals from terminal devices, or both. In FIG. 7 the first indoor access point 534 is also illustrated to be in communication with two relay nodes 533,575. A first example of a relay node 533 is an RF transceiver that has a direct wireline communication link with a desktop computer 538. Although not specifically shown, the RF transceiver may also be configured to be in wireless communication with terminals that are located in some predefined proximity to the relay node 533. A second example of a relay node 575 is an RF transceiver that is collocated with a lamp. The RF transceiver is configured to allow an RF communication being received by the RF transceiver to be passed along to photo detector-enabled terminals by white LED lights in the lamp. Although not specifically shown, the RF transceiver in the lamp may also be configured to be in wireless communication with terminals that are located in some predefined proximity to the relay.

In FIG. 7 the second indoor access point 535 is illustrated to be coupled to three distinct LED white light sources 540. The LED white light sources 540 may include one or more white light LEDs or groupings of coloured LEDs that result in white light. The second indoor access point 535 is illustrated to be coupled to two photo detector arrays 545 for detecting optical signals transmitted by terminal devices in the room or optical relay nodes, such as desk or floor lamps that are transmitting signals from terminal devices, or both. The second indoor access point 534 is also illustrated to be in communication with an relay node 575, in particular, a lamp relay node.

While FIG. 7 illustrates only a single room of a single floor of an office building it is to be understood that the concept applied to the single room on the single floor is scalable to multiple rooms on multiple floors. Furthermore, while FIG. 7 illustrates groups of three white light LED sources 540 an two photo detectors 545, two relay lamps, a single relay coupled to a desktop computer and a number of terminals, it is to be understood that the number of white light LED sources, the number of photo detectors, the type and respective number of relays and the number of terminals are specific to particular implementations.

In operation, for DL operation, the base station 510 receives communication from a source in the network to be passed on to a terminal in the structure 530. The base station 510 sends a communication to one or more of the low power distributed antennas 520. The low power distributed antennas 520 then forward the communication to the outdoor access point 532 of the structure 530. The outdoor access point 532 then forwards the communication to one or more of the indoor access points 534,535. The indoor access points 534,535 forward the communication on to the terminals, or relays 533,575, to be forwarded to the terminal, via an optical wave link using the white light LEDs or via an RF link via RF transmitters, or to relay nodes 533,575 and from there on to terminals via an optical wave link using the white light LEDs or via the RF link via RF transmitters.

For UL communications, the terminal device communicates with the indoor access point 534,535 either directly via an RF link or via the white light LEDs to the indoor access point, or to relay nodes 533,575 and onto the indoor access point 534,535. In some implementations the terminal device has an RF antenna to communicate with an RF receiver in the indoor access point. In some embodiments there may be an RF receiver external to the indoor access point that the terminal communicates with and which communicates with the indoor access point. The indoor access point 534,535 then communicates with the outdoor access point 532, the outdoor access point 532 with one or more of the low power distributed antennas 520 and the low power distributed antennas 520 with the base station 510 in the reverse order to that described above in operation of DL communications.

Figure 8:
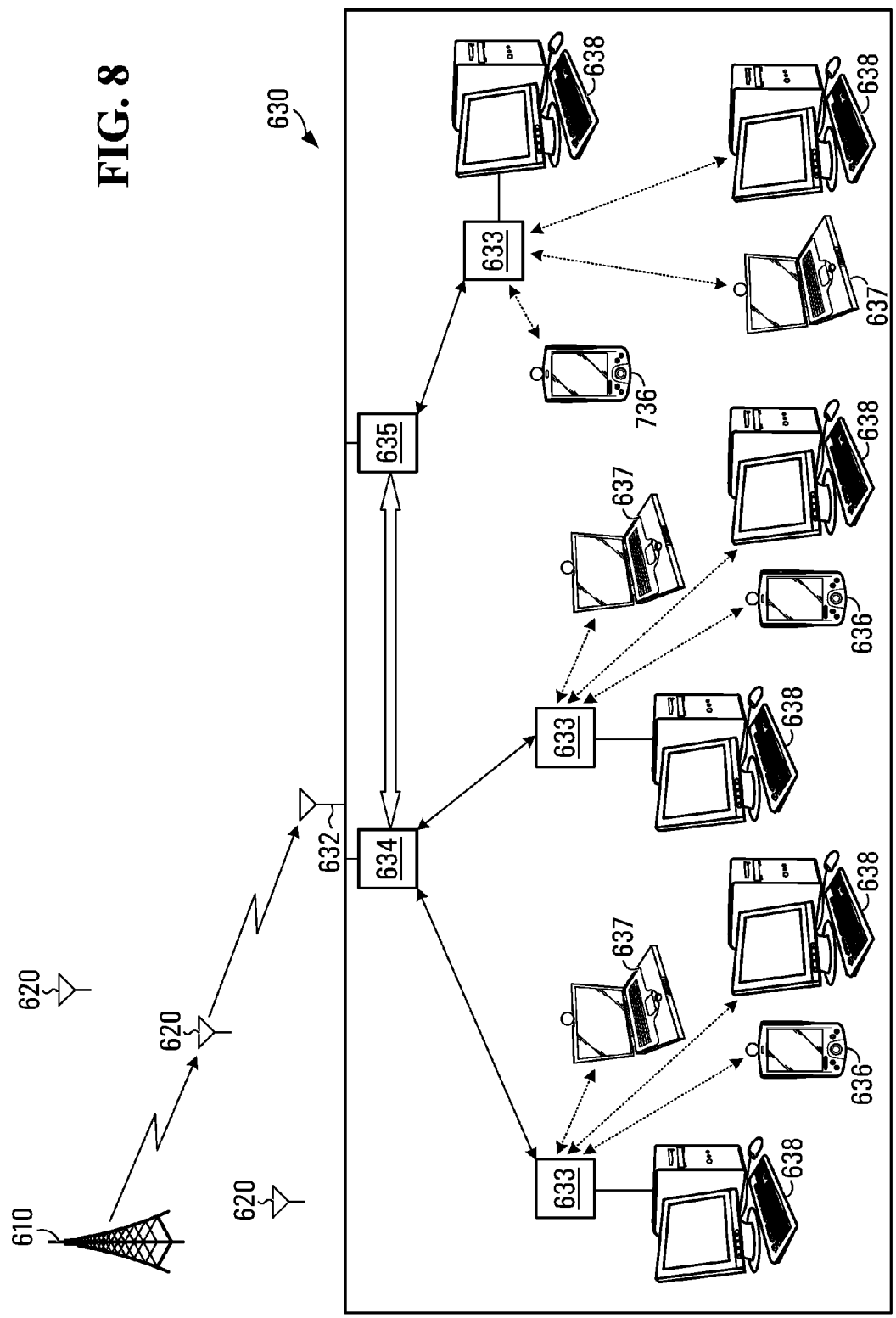
FIG. 8 is schematic diagram of another example network according to an embodiment of the invention for which RF wave links are utilized with an endpoint of the network being a structure having a wireless connection to a network.

FIG. 8 is similar to FIG. 7, except that all of the links are RF wave links, there are no optical wave links.

FIG. 8 includes a base station 610, three low power distributed antennas 620 and a structure 630 in which multiple terminals are located. Particular terminals indicated in FIG. 8 include a cellphone 636, a laptop computer 637 and a desktop computer 638. Further examples of terminals may include, but are not limited to, PDAs, tablets, and video game machines. The structure 630 has an outdoor access point 632, a first indoor access point 634 and a second indoor access point 635. There is a directive link between the indoor access points for communications between the indoor access points 634,635. The directive link is configured to allow communications over an RF link. In FIG. 8 the first indoor access point 634 is illustrated to be in communication with two RF relay nodes 633. Each of the RF relay nodes 633 are RF transceivers that have a direct wireline communication link with a desktop computer 638. The RF transceiver is also illustrated to be in wireless communication with terminals that are located in some predefined proximity to the RF relay node 633.

In FIG. 8 the second indoor access point 635 is illustrated to be in communication with a single RF relay node 633. The single RF relay node 633 is coupled via a direct wireline communication link with a desktop computer 638 and is in wireless communication with terminals that are located in some predefined proximity to the RF relay node 633.

While FIG. 8 illustrates only a single room of a single floor of an office building it is to be understood that the concept applied to the single room on the single floor is scalable to multiple rooms on multiple floors. Furthermore, while FIG. 8 illustrates one indoor access point communicating with two RF relays each coupled via a wired link to a desktop, a second indoor access point communicating with only a single RF relay coupled via a wired link to a desktop and a number of terminals, it is to be understood that the number of relay nodes that any given indoor access node may communicate with, the number of indoor access nodes that any given RF relay may communicate with and the number of terminals are implementation specific.

In operation, for DL operation, the base station 610 receives communication from a source in the network to be passed on to a terminal in the structure 630. The base station 610 sends a communication to one or more of the low power distributed antennas 620. The low power distributed antennas 620 then forward the communication to the outdoor access point 632 of the structure 630. The outdoor access point 632 then forwards the communication to the indoor access points 634,635. The indoor access points 634,635 forward the communication onto the relay nodes 633 and the relay nodes 633 forward the communication to the terminals.

For UL communications, the terminal device communicates with a relay node 633 and the relay node 633 communicates with the indoor access point 634,635 directly via an RF link. The terminal device has an RF antenna to communicate with an RF receiver in the indoor access point 634,635. The indoor access point 634,635 then communicates with the outdoor access point 632, the outdoor access point 632 with one or more of the low power distributed antennas 620 and the low power distributed antennas 620 with the base station 610 in the reverse order to that described above in operation of DL communications.

Figure 9:
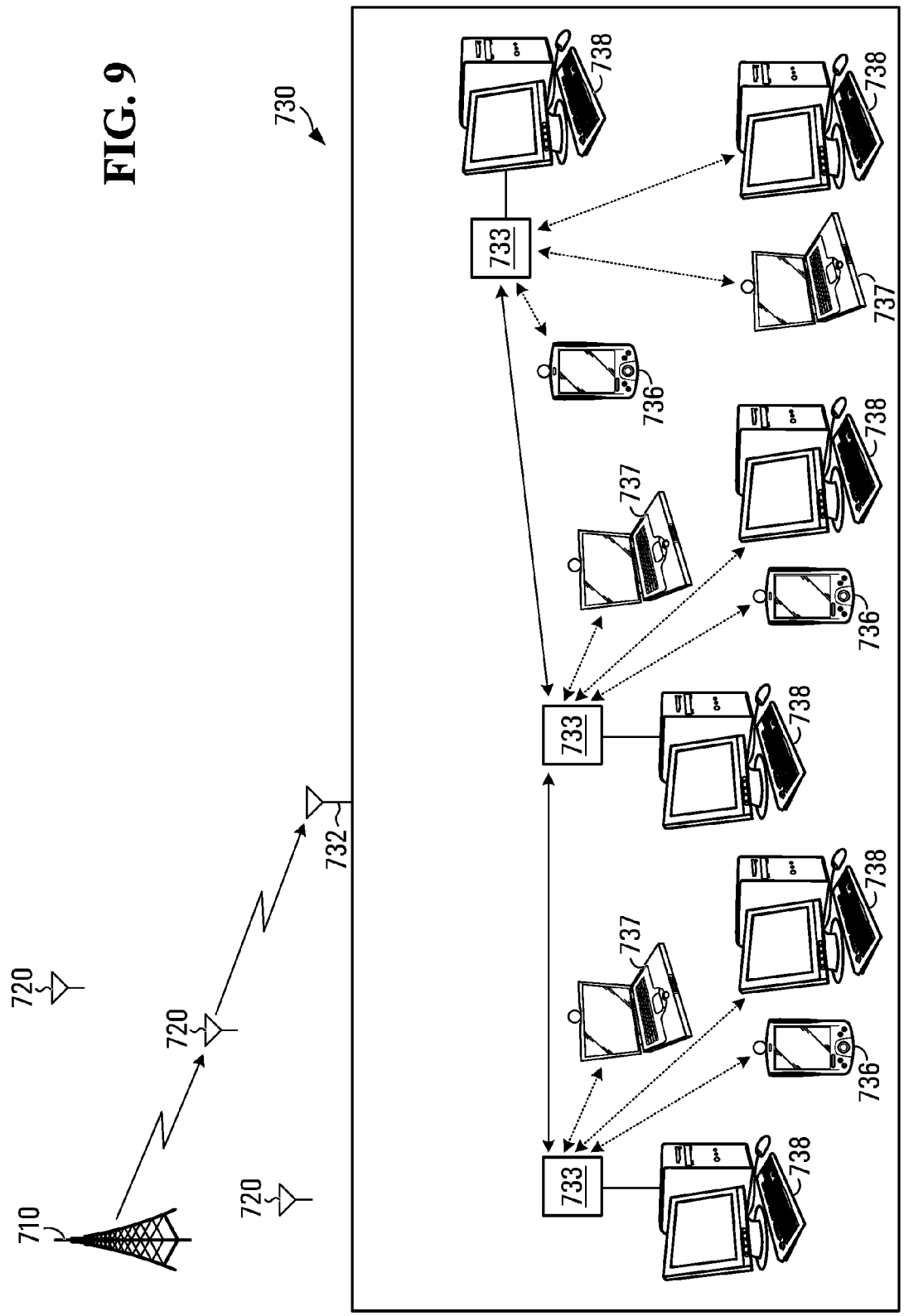
FIG. 9 is schematic diagram of yet another example network according to an embodiment of the invention for which RF wave links are utilized with an endpoint of the network being a structure having a wireless connection to a network.

FIG. 9 is similar to FIG. 8, except that there are no first and second indoor access points, the outdoor access point communicates directly with relay nodes in the room.

FIG. 9 includes a base station 710, three low power distributed antennas 720 and a structure 730 in which multiple terminals are located. Particular terminals indicated in FIG. 9 include a cellphone 736, a laptop computer 737 and a desktop computer 738. Further examples of terminals may include, but are not limited to, PDAs, tablets, and video game machines. The structure 730 has an outdoor access point 732. In FIG. 9 the outdoor access point 732 is illustrated to be in communication with three relay nodes 733. Each of the relay nodes 733 is RF transceivers that have a direct wireline communication link with a desktop computer 738. The RF transceiver is also illustrated to be in wireless communication with terminals that are located in some predefined proximity to the relay node 733.

While FIG. 9 illustrates only a single room of a single floor of an office building it is to be understood that the concept applied to the single room on the single floor is scalable to multiple rooms on multiple floors. Furthermore, while FIG. 9 illustrates one outdoor access point communicating with three RF relays each coupled via a wired link to a desktop and a number of terminals, it is to be understood that the number of relay nodes that any given outdoor access node may communicate with and the number of terminals are implementation specific.

In some embodiments, in a given building, there may be one or more outdoor access points and different floors of the building may have different configurations, i.e. some floors have one or more indoor access points, as illustrated in FIG. 8, and other floors do not have any indoor access points, but one or more of the outdoor access points communicate with relay nodes. In some embodiments, different floors may have different configurations as described above and other floors that may use RF links or optical wave links, or both, as illustrated in FIG. 7.

In operation, for DL operation, the base station 710 receives communication from a source in the network to be passed on to a terminal in the structure 730. The base station 710 sends a communication to one or more of the low power distributed antennas 720. The low power distributed antennas 720 then forward the communication to the outdoor access point 732 of the structure 730. The outdoor access point 732 then forwards the communication to the relay nodes 733 and the relay nodes 733 forward the communication to the terminals.

For UL communications, the terminal device communicates with a relay node 733 and the relay node 733 communicates with the outdoor access point 732 directly via an RF link. The terminal device has an RF antenna to communicate with an RF receiver in the relay node 733. The outdoor access point 732 communicates with one of more of the low power distributed antennas 720 and the low power distributed antennas 720 with the base station 710 in the reverse order to that described above in operation of DL communications.

Figure 10:
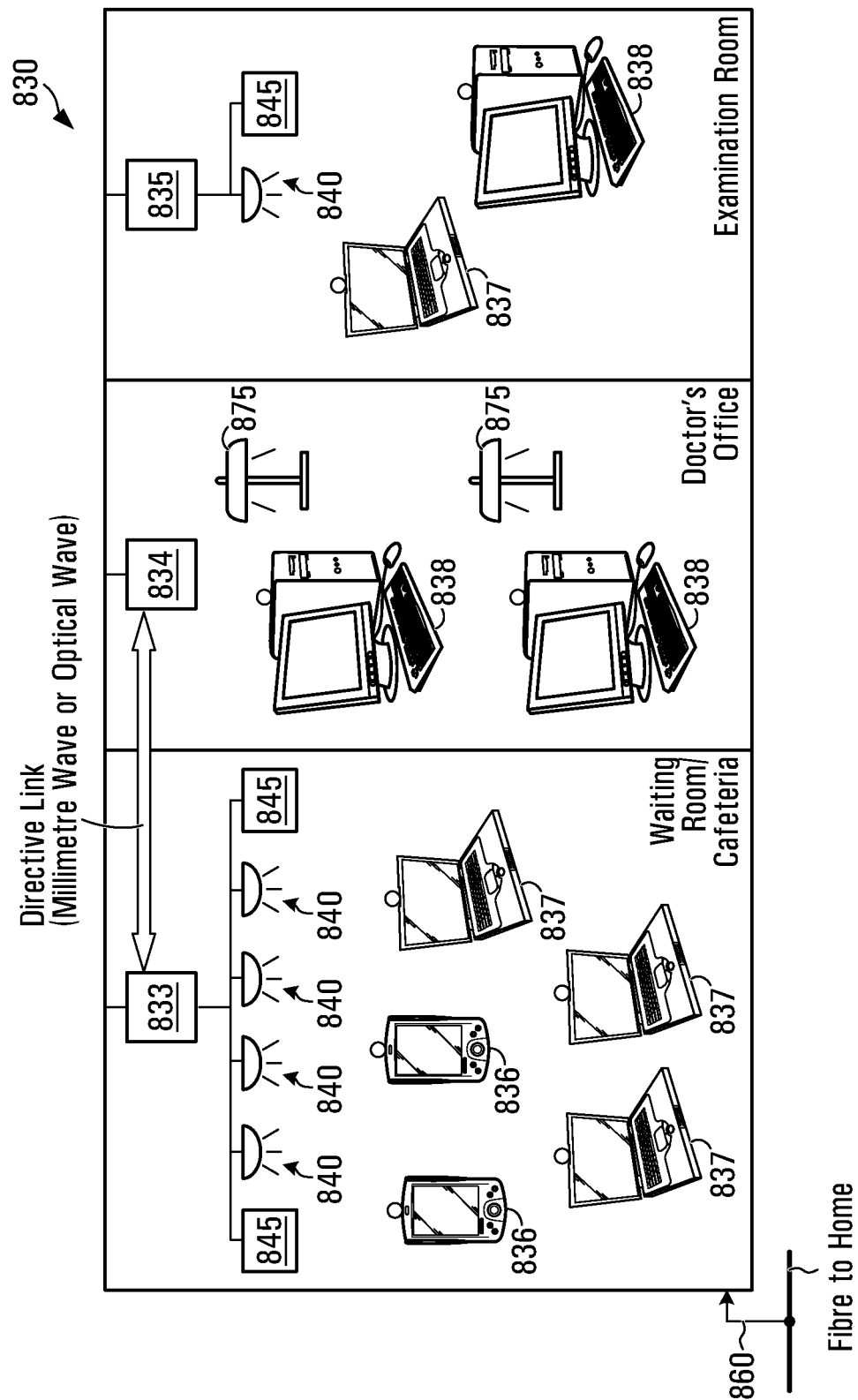
FIG. 10 is schematic diagram of a network within a multi-room structure according to an embodiment of the invention for which optical wave and RF wave links are utilized.

FIG. 10 illustrates a portion of a network for an example scenario for use in a hospital or medical clinic for a particular example of a combination of RF and optical wave links with a wireline connection to the hospital.

FIG. 10 includes a structure 830 having three distinct areas, namely a waiting room, a doctor's office and an examination room. Each of the areas is illustrated to include multiple terminals. Particular terminals indicated in FIG. 10 include a cellphone 836, a laptop computer 837 and a desktop computer 838. Further examples of terminals may include, but are not limited to, PDAs, tablets, and video game machines.

The structure 830 has wired connection 860, a first indoor access point 833, a second indoor access point 834 and a third indoor access point 835. There is a directive link between the first and second indoor access points 833,834 and between the second and third indoor access points 834,835. The directive link may be configured to allow communications over an RF link, an optical wave link, or both. In FIG. 10, the first indoor access point 833 is illustrated to be coupled to an array of four distinct LED white light sources 840. Each of the LED white light sources 840 may include one or more white light LEDs or groupings of coloured LEDs that result in white light. The first indoor access point 833 is illustrated to be coupled to two photo detector arrays 845 for detecting optical signals transmitted by terminal devices in the room or relay nodes, such as desk or floor lamps that are transmitting signals from terminal devices, or both.

In FIG. 10 the second indoor access point 834 is illustrated to be an RF transceiver. The second indoor access point 834 is illustrated as being in communication with two relay nodes 875 and two desktops computers 838.

In FIG. 10 the third indoor access point 835 is illustrated to be coupled to a single distinct LED white light source 840. The LED white light source 840 may include one or more white light LEDs or groupings of coloured LEDs that result in white light. The third indoor access point 835 is illustrated to be coupled to one photo detector array 845 for detecting optical signals transmitted by terminal devices in the room or relay nodes, such as desk or floor lamps that are transmitting signals from terminal devices, or both.

While FIG. 10 illustrates three rooms in the structure 830 for a single floor with different numbers of white light LEDs or groupings of white light LEDs and different numbers of relay nodes for different rooms and a number of terminals, it is to be understood that the number of rooms in the structure, the number of floors, the number of white light LED sources, the number of photo detectors and the number of terminals are specific to particular implementations.

In operation, for DL operation, the wired connection 860 delivers communication from a source in the network to be passed on to a terminal in the structure 830. One or more of the indoor access points 833,834,835 receive communications from the wired connection 860 and forward the communications on to the terminals via an optical wave link using the white light LEDs or via the RF link via RF transmitters in the indoor access points 833,834,835 and in some cases from the indoor access points 833,834,835 to relay nodes 875 and onto the terminals.

For UL communications, the terminal device communicates with the indoor access point 833,834,835 either directly via an RF link, via the white light LEDs to the indoor access point or using an RF link or the optical wave link via a relay node 875 on to the indoor access point 833,834,835. In some implementations, the terminal device has an RF antenna to communicate with an RF receiver in the indoor access point. The indoor access points 834,835,836 then communicate with the wired connection 860 to send the UL communication back to the network on the wired connection.

In some embodiments, a method is provided that includes transmitting a communication signal between a base station and a terminal located within a structure via one or more low power distributed antennas, at least one outdoor access point outside of the structure, at least one indoor access point inside of the structure. The communication signal is transmitted on links between the base station, in particular links between the base station and the one or more low power distributed antennas, a low power distributed antenna and the at least one outdoor access point, the outdoor access point and the at least one indoor access point and the indoor access point and the terminal, in which the links include at least one radio frequency (RF) link, the at least one radio wave link including both regulated bands and unregulated bands.

In some embodiments, transmitting a communication signal between a base station and a terminal includes a first step 11-1 of transmitting the communication signal between the base station and at least one of the one or more low power distributed antennas. A second step 11-2 includes transmitting the communication signal between the at least one low power distributed antenna and at least one of the at least one outdoor access point. A third step 11-3 includes transmitting the communication signal between the at least one outdoor access point and at least one of the at least one indoor access point. A fourth step 11-4 includes transmitting the communication signal between the at least one indoor access point and the terminal.

In some embodiments, transmitting the communication signal between the base station and the terminal located within the structure includes transmitting the communication signal in a direction from the base station to the terminal. In some embodiments, transmitting the communication signal between the base station and the terminal located within the structure includes transmitting the communication signal in a direction from the terminal to the base station.

In some embodiments, the at least one RF link includes a millimeter wave band link or a microwave band link.

In some embodiments, at least one link between the one or more low power distributed antennas is an optical band link.

In some embodiments, a link between a low power distributed antenna and an outdoor access point is an optical band link.

In some embodiments, a link between two indoor access points is an optical band link.

In some embodiments, a link between an indoor access point and the terminal is an optical band link. In some embodiments, the optical wave link is a visual wavelength link. In some embodiments, a link between an indoor access point and the terminal is an infrared wavelength link.

In some embodiments, at least one of the at least one indoor access point is coupled to at least one white light LED source configured to retransmit the communication signal to the terminal, which is configured to receive an optical wave communication signal. In some embodiments, the at least one white light LED source is a red LED, a green LED and a blue LED that collectively generate white light. In some embodiments, a single LED that is configured to generate white light.

In some embodiments, the at least one of the at least one indoor access point is coupled to at least one photo detector configured to receive a communication signal from the terminal, which is configured to transmit an optical wave communication signal.

In some embodiments, between at least one of the at least one indoor access point and the terminal there is a relay node configured to receive a communication signal by an RF link and retransmit the communication signal. In some embodiments, the relay node retransmits the communication signal using one or more white light LED sources. In some embodiments, relay node is one of a floor lamp and a desk lamp.

In some embodiments, the communication signal has a universal air-interface when transmitted on different RF frequency links and optical wave band links. In some embodiments, the universal air-interface is consistent with orthogonal frequency division multiplexing (OFDM) or single carrier frequency division multiplexing (SC-FDM).

Figure 12:
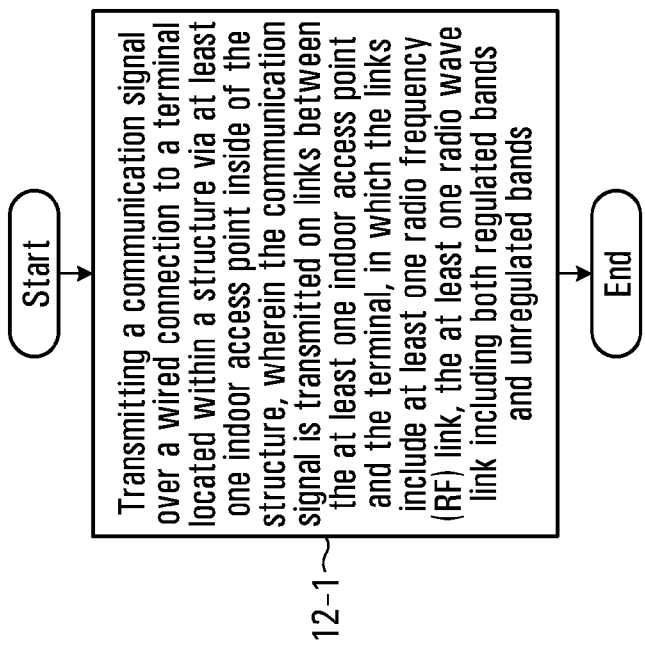
FIG. 12 is a flow chart of another example method of transmitting a communication signal over a network according to some embodiments of the invention.
Figure 11:
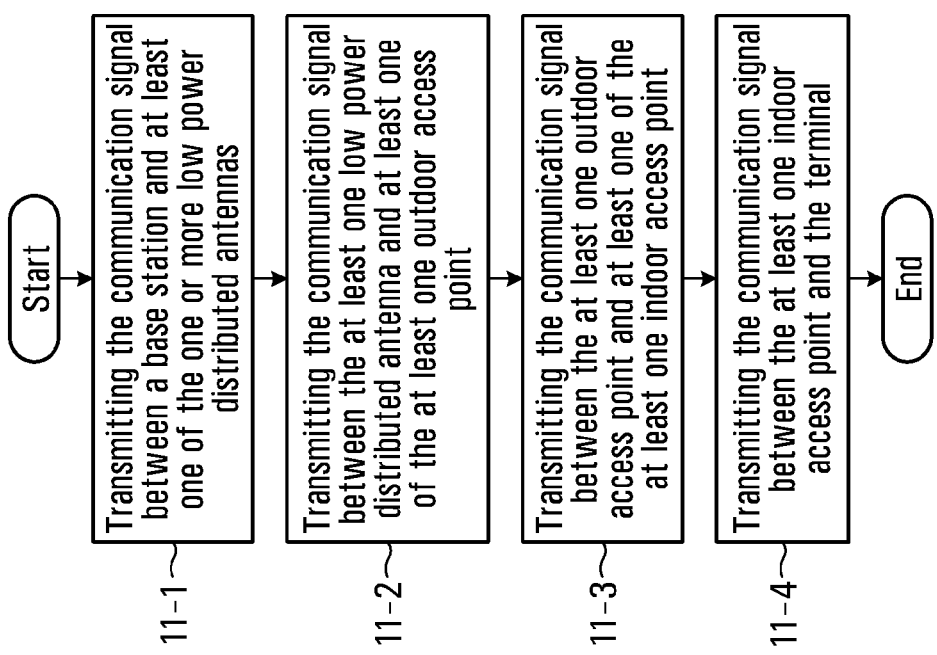
FIG. 11 is a flow chart of an example method of transmitting a communication signal over a network according to some embodiments of the invention.

In some embodiments there is a method provided that is similar to that described above, but instead of a wireless link between the base station and structure, there is a wired link to the structure from the network as illustrated in FIG. 12. However, as indicated in step 12-1, the communication signal that is transmitted on links between the at least one indoor access point and the terminal, is transmitted on links in which at least one link is an RF link, the at least one radio wave link including both regulated bands and unregulated bands.

More generally, in some embodiments, as illustrated in FIG. 13, considering just the immediate operating environment of the structure, a method involves a step (13-1) of transmitting a communication signal to a terminal located within the structure includes transmitting a communication signal via at least one indoor access point inside of the structure, wherein the communication signal is transmitted on links between the at least one indoor access point and the terminal, in which the links include at least one radio frequency (RF) link, the at least one RF link including both regulated bands and unregulated bands.

In addition, in some embodiments, as illustrated in FIG. 14, considering just the immediate operating environment of the structure, a method involves a step (14-1) of transmitting a communication signal to a terminal located within the structure includes transmitting a communication signal via at least one indoor access point inside of the structure, wherein the communication signal is transmitted on links between the at least one indoor access point and the terminal, wherein at least one of the at least one indoor access point is coupled to at least one white light LED source configured to transmit the communication signal to the terminal.

In some embodiments, at least one link between the at least one indoor access point and the terminal is an RF link, the RF link being at least one of a regulated RF band and an unregulated RF bands. In some embodiments, the RF link includes a millimeter wave band link or a microwave band link. In some embodiments, a link between two indoor access points is one or an RF link or an optical band link. In some embodiments, the at least one white light LED source is a red LED, a green LED and a blue LED that collectively generate white light. In some embodiments, the at least one white light LED source is a single LED that is configured to generate white light. In some embodiments, the at least one white light LED source is configured for use in a frequency division duplex mode of operation or a time division duplex mode of operation.

In some embodiments, the at least one of the at least one indoor access point is coupled to at least one photo detector configured to receive a communication signal from the terminal, which is configured to transmit an optical wave communication signal.

In some embodiments, between at least one of the at least one indoor access point and the terminal there is an relay node configured to receive a communication signal by RF link and retransmit the communication signal. In some embodiments, the relay node retransmits the communication signal using one or more white light LED source. In some embodiments, the relay node is one of a floor lamp and a desk lamp.

In some embodiments, the communications signal has a universal air-interface when transmitted on different band over the various links. In some embodiments, the universal air-interface is consistent with orthogonal frequency division multiplexing (OFDM) or single carrier frequency division multiplexing (SC-FDM).

In the various methods described above, the structure may be one of: a multi-room building, a multi-floor building, a multi-floor multi-room building, a vehicle.

In the various methods described above, transmitting a communication signal comprising transmitting a communication signal for unicast, multicast and broadcast scenarios.

Numerous modifications and variations of the present invention are possible in light of the above teachings. It is therefore to be understood that within the scope of the appended claims, the invention may be practised otherwise than as specifically described herein.

The invention claimed is:
1. A method comprising:
transmitting a communication signal between a base station and a terminal located within a structure via one or more low power distributed antennas, at least one outdoor access point outside of the structure, at least one indoor access point inside of the structure, wherein the communication signal is transmitted on links between the base station and the terminal, in which the links include at least one radio frequency (RF) link, the at least one radio frequency link including both regulated bands and unregulated bands,
wherein between at least one of the at least one indoor access point and the terminal there is a relay node configured to receive a communication signal by an RF link and retransmit the communication signal.

2. The method of claim 1, wherein the at least one RF link includes a millimeter wave band link or a microwave band link.

3. The method of claim 1, wherein at least one link between the one or more low power distributed antennas is an optical band link.

4. The method of claim 1, wherein a link between a low power distributed antenna and an outdoor access point is an optical band link.

5. The method of claim 1, wherein a link between two indoor access points is an optical band link.

6. The method of claim 1, wherein a link between an indoor access point and the terminal is an optical band link.

7. The method of claim 1, wherein at least one of the at least one indoor access point is coupled to at least one white light LED source configured to retransmit the communication signal to the terminal, which is configured to receive an optical wave communication signal.

8. The method of claim 7, wherein the at least one white light LED source comprises at least one of:
   i) a red LED, a green LED and a blue LED that collectively generate white light; and
   ii) a single LED that is configured to generate white light.

9. The method of claim 7, wherein the at least one of the at least one indoor access point is coupled to at least one photo detector configured to receive a communication signal from the terminal, which is configured to transmit an optical wave communication signal.

10. The method of claim 1, wherein the relay node retransmits the communication signal using one or more white light LED sources.

11. The method of claim 1, wherein the communication signal has a universal air-interface when transmitted on different RF frequency links and optical wave band links.

12. The method of claim 11, wherein the universal air-interface is consistent with orthogonal frequency division multiplexing (OFDM) or single carrier frequency division multiplexing (SC-FDM).

13. The method of claim 1, wherein transmitting a communication signal between a base station and a terminal comprises:
   transmitting the communication signal between a base station and at least one of the one or more low power distributed antennas;
   transmitting the communication signal between the at least one low power distributed antenna and at least one of the at least one outdoor access point;
   transmitting the communication signal between the at least one outdoor access point and at least one of the at least one indoor access point;
   transmitting the communication signal between the at least one indoor access point and the terminal.

14. The method claim 1, wherein transmitting the communication signal between the base station and the terminal located within the structure comprises one of:
   i) transmitting the communication signal in a direction from the base station to the terminal; and
   ii) transmitting the communication signal in a direction from the terminal to the base station.

15. A method comprising:
   within a structure, transmitting a communication signal to a terminal located within the structure via at least one indoor access point inside of the structure, wherein the communication signal is transmitted on links between the at least one indoor access point and the terminal, in which the links include at least one radio frequency (RF) link, the at least one RF link including both regulated bands and unregulated bands,
   wherein between at least one of the at least one indoor access point and the terminal there is a relay node configured to receive a communication signal by an RF link and retransmit the communication signal.

16. A method comprising:
   within a structure, transmitting a communication signal to a terminal located within the structure via at least one indoor access point inside of the structure, wherein the communication signal is transmitted on links between the at least one indoor access point and the terminal, wherein at least one of the at least one indoor access point is coupled to at least one white light LED source configured to transmit the communication signal to the terminal, wherein between at least one of the at least one indoor access point and the terminal there is a relay node configured to receive a communication signal by an RF link and retransmit the communication signal, in which the links include at least one radio frequency (RF) link, the at least one radio frequency link including both the regulated bands and unregulated bands.

17. A system comprising:
   a base station;
   one or more low power distributed antennas;
   at least one outdoor access point mounted outside of a structure;
   at least one indoor access point mounted inside of the structure;
   at least one relay node configured to receive a communication signal from the at least one indoor access point by an RF link and retransmit the communication signal to a terminal located within the structure;
   wherein the system is configured to transmit the communication signal between the base station and the terminal via the one or more low power distributed antennas, the at least one outdoor access point, the at least one indoor access point, the at least one relay node, wherein the communication signal is transmitted on communication links between the base station and the terminal, in which the links include at least one radio frequency (RF) link, the at least one radio frequency link including both regulated bands and unregulated bands.

18. A system comprising:
   at least one indoor access point mounted inside of a structure;
   at least one relay node configured to receive a communication signal from the at least one indoor access point by an RF link and retransmit the communication signal to a terminal located within the structure;
   wherein the system is configured to transmit the communication signal between the at least one indoor access point and the terminal, wherein the communication signal is transmitted on communication links between the at least one indoor access point and the terminal, in which the links include at least one radio frequency (RF) link, the at least one radio frequency link including both regulated bands and unregulated bands.

19. A system comprising:
   at least one indoor access point mounted inside of a structure;
   at least one relay node configured to receive a communication signal from the at least one indoor access point by an RF link and retransmit the communication signal to a terminal located within the structure, the at least one radio frequency link including both the regulated bands and unregulated bands;

wherein the system is configured to transmit the communication signal to the terminal via the at least one indoor access point, wherein the communication signal is transmitted on links between the at least one indoor access point and the terminal, wherein at least one of the at least one indoor access point is coupled to at least one white light LED source configured to transmit the communication signal to the terminal.

\* \* \* \* \*